(12) United States Patent
Barker et al.

(10) Patent No.: US 10,913,086 B2
(45) Date of Patent: Feb. 9, 2021

(54) DRIFT SENSOR FOR AGRICULTURAL SPRAYING

(71) Applicant: Deere & Company, Moline, IL (US)

(72) Inventors: Mark E. Barker, Johnston, IA (US); Richard A. Humpal, Ankeny, IA (US); Aaron A. Wells, Ankeny, IA (US)

(73) Assignee: Deere & Company, Moline, IL (US)

( * ) Notice: Subject to any disclaimer, the term of this patent is extended or adjusted under 35 U.S.C. 154(b) by 401 days.

(21) Appl. No.: 15/865,553

(22) Filed: Jan. 9, 2018

(65) Prior Publication Data

US 2019/0047010 A1 Feb. 14, 2019

Related U.S. Application Data

(63) Continuation-in-part of application No. 15/671,476, filed on Aug. 8, 2017, now Pat. No. 10,252,285.

(51) Int. Cl.
*B05B 15/14* (2018.01)
*A01M 7/00* (2006.01)
(Continued)

(52) U.S. Cl.
CPC ............ *B05B 15/14* (2018.02); *A01B 69/008* (2013.01); *A01B 79/005* (2013.01); *A01M 7/0089* (2013.01); *B05B 9/06* (2013.01); *B05B 12/082* (2013.01); *B05B 12/12* (2013.01); *B05B 12/16* (2018.02); *B64C 39/024* (2013.01); *G05D 1/042* (2013.01); *A01C 21/005* (2013.01); *A01C 23/008* (2013.01); *B05B 9/0423* (2013.01); *B05B 13/005* (2013.01); *B64C 2201/042* (2013.01);
(Continued)

(58) Field of Classification Search
None
See application file for complete search history.

(56) References Cited

U.S. PATENT DOCUMENTS 5,334,987 A    8/1994  Teach
5,704,546 A *  1/1998  Henderson .......... A01M 7/0089
                                                    239/1

(Continued)

FOREIGN PATENT DOCUMENTS

AU    2015101838 A4   2/2016
CN     110973103 A    4/2010
(Continued)

OTHER PUBLICATIONS

EP Extended Search Report Application No. 18187034.6-1006 dated Oct. 11, 2018, 7 pages.
(Continued)

*Primary Examiner* — Peter D Nolan
*Assistant Examiner* — Luat T Huynh
(74) *Attorney, Agent, or Firm* — Joseph R. Kelly; Kelly, Holt & Christenson PLLC

(57) ABSTRACT

Wind speed, wind direction, and field boundary information are detected and used to identify a monitor area indicative of a likely overspray condition. Control signals are generated to obtain information from a sprayed substance sensor, in the monitor area. When an overspray condition is detected, an overspraying signal from the sprayed substance sensor indicating the detected overspray condition is received and overspray processing is performed, based upon the received overspray signal.

20 Claims, 21 Drawing Sheets

(51) Int. Cl.
| | |
|---|---|
| *B05B 12/16* | (2018.01) |
| *A01B 69/04* | (2006.01) |
| *A01B 79/00* | (2006.01) |
| *B05B 9/06* | (2006.01) |
| *B05B 12/08* | (2006.01) |
| *B05B 12/12* | (2006.01) |
| *B64C 39/02* | (2006.01) |
| *G05D 1/04* | (2006.01) |
| *A01C 21/00* | (2006.01) |
| *A01C 23/00* | (2006.01) |
| *B05B 9/04* | (2006.01) |
| *B05B 13/00* | (2006.01) |

(52) U.S. Cl.
CPC .... *B64C 2201/12* (2013.01); *B64C 2201/148* (2013.01); *B64C 2201/208* (2013.01)

(56) References Cited

U.S. PATENT DOCUMENTS

| | | | |
|---|---|---|---|
| 6,653,971 B1* | 11/2003 | Guice | A01M 1/026 342/22 |
| 7,640,797 B2 | 1/2010 | Smith et al. | |
| 8,760,303 B2 | 6/2014 | Hillger et al. | |
| 9,428,272 B2* | 8/2016 | Markov | B64D 1/16 |
| 9,510,586 B2* | 12/2016 | Hyde | A01G 22/00 |
| 9,540,105 B2* | 1/2017 | Markov | B64D 1/16 |
| 9,598,172 B2* | 3/2017 | Markov | B64D 1/16 |
| 9,743,655 B2* | 8/2017 | Hillger | A01M 7/0089 |
| 9,745,060 B2* | 8/2017 | O'Connor | A01B 79/005 |
| 9,877,470 B2* | 1/2018 | Crinklaw | B05B 12/122 |
| 10,252,285 B2 | 4/2019 | Paralikar et al. | |
| 10,441,965 B2* | 10/2019 | Feldhaus | B05B 12/126 |
| 2007/0250412 A1 | 10/2007 | Anderson | |
| 2012/0168528 A1 | 7/2012 | Hillger et al. | |
| 2012/0169504 A1 | 7/2012 | Hillger et al. | |
| 2014/0024313 A1* | 1/2014 | Campbell | H04B 1/3822 455/41.2 |
| 2014/0303814 A1* | 10/2014 | Burema | B64D 1/16 701/3 |
| 2014/0316692 A1 | 10/2014 | Hillger et al. | |
| 2016/0157414 A1* | 6/2016 | Ackerman | A01B 69/008 701/25 |
| 2016/0334276 A1* | 11/2016 | Pluvinage | G01J 3/2823 |
| 2016/0368011 A1 | 12/2016 | Feldhaus et al. | |
| 2017/0015416 A1* | 1/2017 | O'Connor | A01M 7/0089 |
| 2017/0031365 A1 | 2/2017 | Sugumaran et al. | |
| 2017/0127606 A1* | 5/2017 | Horton | A01C 5/06 |
| 2017/0129605 A1* | 5/2017 | Wu | B05B 12/02 |
| 2017/0227969 A1 | 8/2017 | Murray | |
| 2017/0258005 A1* | 9/2017 | Cutter | A01C 21/005 |
| 2017/0334560 A1* | 11/2017 | O'Connor | B64C 39/024 |
| 2018/0052088 A1 | 2/2018 | Sarkar et al. | |
| 2018/0074499 A1* | 3/2018 | Cantrell | G05D 1/0088 |
| 2018/0074518 A1* | 3/2018 | Cantrell | G05D 1/101 |
| 2018/0099747 A1* | 4/2018 | Peng | B05B 13/005 |
| 2018/0129879 A1* | 5/2018 | Achtelik | G01C 5/00 |
| 2018/0164179 A1* | 6/2018 | Bagasra | B64D 1/18 |
| 2018/0206475 A1* | 7/2018 | Carter | B64C 39/024 |
| 2018/0209895 A1* | 7/2018 | Carter | G01N 21/6428 |
| 2019/0047010 A1 | 2/2019 | Barker | |
| 2019/0075778 A1 | 3/2019 | Barker | |
| 2019/0116726 A1 | 4/2019 | Paralikar et al. | |
| 2019/0239500 A1 | 8/2019 | Barker | |

FOREIGN PATENT DOCUMENTS

| | | |
|---|---|---|
| CN | 202551673 U | 11/2012 |
| CN | 202857639 U | 4/2013 |
| CN | 203597280 U | 5/2014 |
| CN | 205087153 U | 3/2016 |
| CN | 105707045 A | 6/2016 |
| CN | 205408540 U | 8/2016 |
| CN | 205596968 U | 9/2016 |
| CN | 106598090 A | 4/2017 |
| CN | 206403004 U | 8/2017 |
| CN | 107128484 A | 9/2017 |
| CN | 107173369 A | 9/2017 |
| CN | 107211982 A | 9/2017 |
| CN | 107211983 A | 9/2017 |
| CN | 107646818 A | 2/2018 |
| CN | 207639534 U | 7/2018 |
| CN | 108605923 A | 10/2018 |
| CN | 109169585 A | 1/2019 |
| CN | 109258601 A | 1/2019 |
| CN | 109526918 A | 3/2019 |
| CN | 208905370 U | 5/2019 |
| CN | 109864057 A | 6/2019 |
| CN | 209711229 U | 12/2019 |
| EP | 2227949 A1 | 9/2010 |
| EP | 2658370 A1 | 11/2013 |
| EP | 2658371 A1 | 11/2013 |
| EP | 2898773 A1 | 1/2015 |
| WO | 9712688 A1 | 4/1997 |
| WO | 2016145081 A2 | 9/2016 |
| WO | 2020142822 A1 | 7/2020 |

OTHER PUBLICATIONS

EP Extended Search Report Application No. 18187025.4-1006 dated Oct. 11, 2018, 8 pages.

Drones and UAVs: What is available now and what is possible in the future © Grains Research and Development Corporation 2017. Obtained Dec. 29, 2016, 5 pages.

https://www.cdti.es/recursos/doc/Programas/Cooperacion_internacional/Bilateral_India/Expresiones_de_Interes/43466_1461462016145315.pdf, Nueva Delhi, India Mayo 2016, 1 page.

Choosing the Right Drone for the Job, Saskatchewan Pulse Growers Pulses, 2016 International Year of Pulses, 4 pages. Obtained Dec. 29, 2016.

U.S. Appl. No. 16/210,586 Notice of Allowance dated Aug. 13, 2020, 8 pages.

U.S. Appl. No. 16/210,566 Notice of Allowance dated Oct. 15, 2020, 8 pages.

* cited by examiner

DRIFT SENSOR FOR AGRICULTURAL SPRAYING

CROSS-REFERENCE TO RELATED APPLICATION

The present application is a continuation-in-part of and claims priority of U.S. patent application Ser. No. 15/671,476, filed Aug. 8, 2017, the content of which is hereby incorporated by reference in its entirety.

FIELD OF THE DESCRIPTION

The present description relates to drift sensing. More specifically, the present description relates to sensing the drift of a chemical being sprayed by an agricultural sprayer.

BACKGROUND

There are many different types of agricultural machines. One such machine is a sprayer. An agricultural sprayer often includes a tank or reservoir that holds a substance to be sprayed on an agricultural field. The sprayer also includes a boom that is fitted with one or more nozzles that are used to spray the substance on the field. As the sprayer travels through the field, the boom is moved to a deployed position and the substance is pumped from the tank or reservoir, through the nozzles, so that is sprayed or applied to the field over which the sprayer is traveling.

Other mobile spraying machines apply a substance to a field as well. For instance, center pivot and lateral move irrigation systems are used to spray irrigation fluid on a field.

It may be undesirable for the substance being sprayed by a sprayer to cross the field boundaries onto an adjacent piece of land. This can be extremely difficult to detect. For instance, some substances are visible with the human eye. Therefore, if a relatively large amount of the substance has passed the field boundary of the field being treated, it can be discerned by human sight. However, other substances are dispersed or sprayed in droplets or granule sizes that are too small to be observed by the human eye. It can thus be very difficult to detect whether an overspray condition (where the spray drifts across a field boundary) has occurred.

The discussion above is merely provided for general background information and is not intended to be used as an aid in determining the scope of the claimed subject matter.

SUMMARY

Wind speed, wind direction, and field boundary information are detected and used to identify a monitor area indicative of a likely overspray condition. Control signals are generated to obtain information from a sprayed substance sensor, in the monitor area. When an overspray condition is detected, an overspray signal from the sprayed substance sensor indicating the detected overspray condition is received and overspray processing is performed, based upon the received overspray signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Some current systems use a fixed sensing apparatus, that is fixed relative to a field boundary, to sense overspray conditions. However, this is relatively costly and cumbersome. Any field for which overspray is to be detected needs the fixed sensing apparatus to be installed. Also, should the field boundary change in the future, then the fixed sensing apparatus must be moved to accommodate the new field boundary. Similarly, many fields have large perimeters. Each field of interest would need to have the fixed sensing apparatus installed to cover all of the perimeters of interest.

Given these difficulties, even if an overspray condition can be detected, it can be even more difficult to detect the extent of an overspray condition. For instance, it can be very difficult to detect a quantity of sprayed substance that crossed the field boundary, and a distance that it traveled into an adjacent field. The present description proceeds with respect to deploying sensors to sense overspray conditions. The sensors can be mobile sensors, portable sensors, semi-permanent sensors or permanent sensors. In one example, if any are permanent, they can be moved (such as raised or lowered) or moved on an articulated arm.

Figure 1:
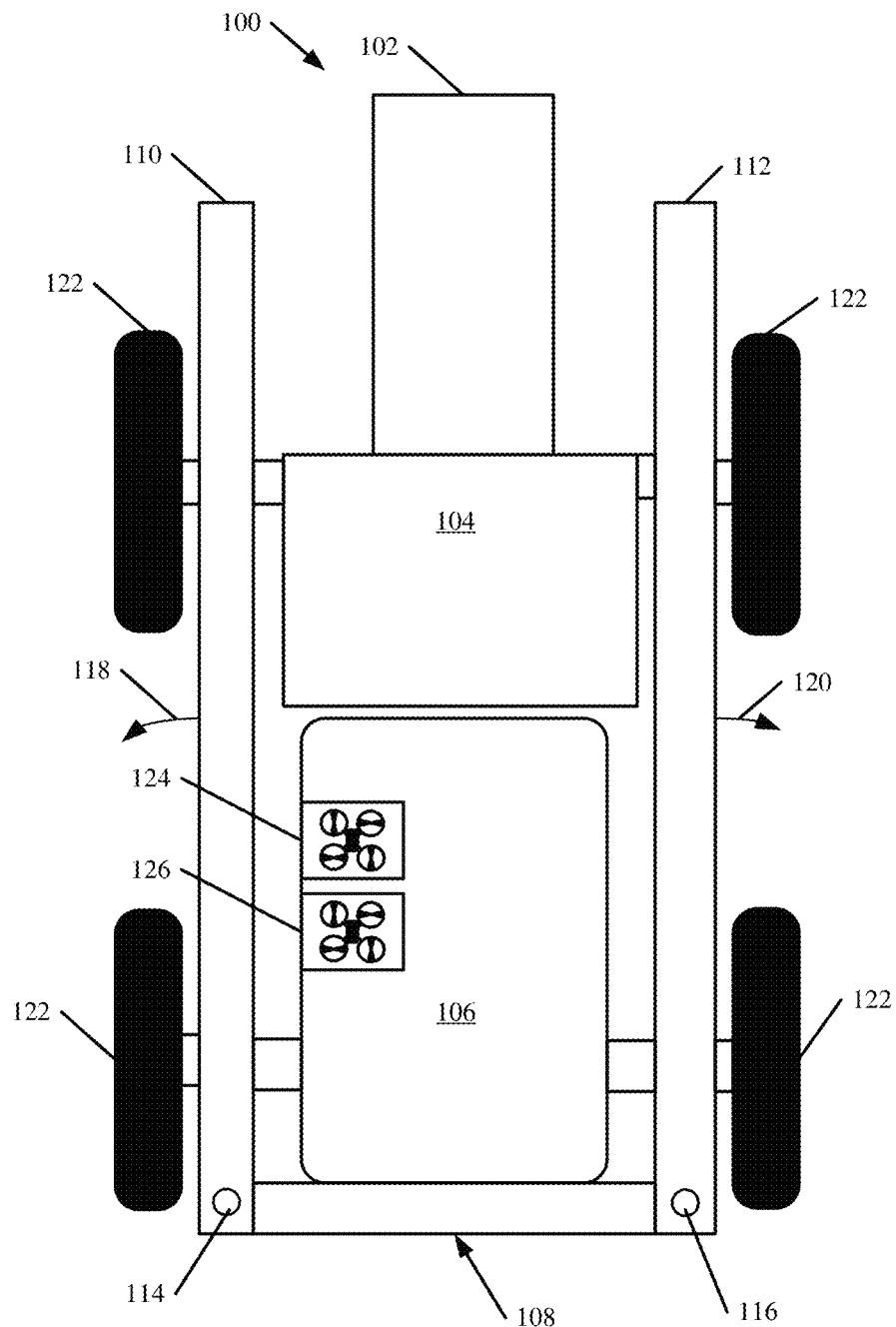
FIG. 1 is a pictorial illustration showing one example of an agricultural spraying machine.

FIG. 1 is a pictorial illustration of one example of an agricultural sprayer 100. Sprayer 100 illustratively includes an engine in engine compartment 102, an operator's compartment 104, a tank 106, that stores material to be sprayed, and an articulated boom 108. Boom 108 includes arms 110 and 112 which can articulate or pivot about points 114 and 116 to a travel position illustrated in FIG. 1. Agricultural sprayer 100 is supported for movement by a set of traction elements, such as wheels 122. The traction elements can also be tracks, or other traction elements as well. When a spraying operation is to take place, boom arms 110-112 articulate outward in the directions indicated by arrows 118 and 120, respectively, to a spraying position. Boom 108 carries nozzles that spray material that is pumped from tank 106 onto a field over which sprayer 100 is traveling. This is described in greater detail below with respect to FIGS. 2-5.

FIG. 1 also shows that, in one example, a set of unmanned aerial vehicles (UAVs) 124-126 are mounted on agricultural sprayer 110 so that they can be carried by agricultural sprayer 110 as it moves to a field to be sprayed, or as it moves through the field. The present description of FIGS. 1-5 will proceed with respect to sensors being deployed on UAVs 124, 126. However, as is described later, the sensors can be deployed in a wide variety of other ways as well.

In one example, UAVs 124-126 have sensors (described in greater detail below) that can sense the substance (or the presence and/or quantity of the substance) being sprayed by sprayer 100. They can be mounted to sprayer 100 with a mounting assembly that releasably holds UAVs 124-126 on machine 100. The mounting assembly may also have a charging coupler which charges and/or changes batteries or other power cells that are used to power UAVs 124-126. When the UAVs 124-126 are to be deployed, they can be released from the mounting assembly and controlled to fly to a desired location, as is described in more detail below. It will be appreciated that the UAVs 124-126 can be coupled to machine 100 either using a tethered link or a wireless link.

Figure 2:
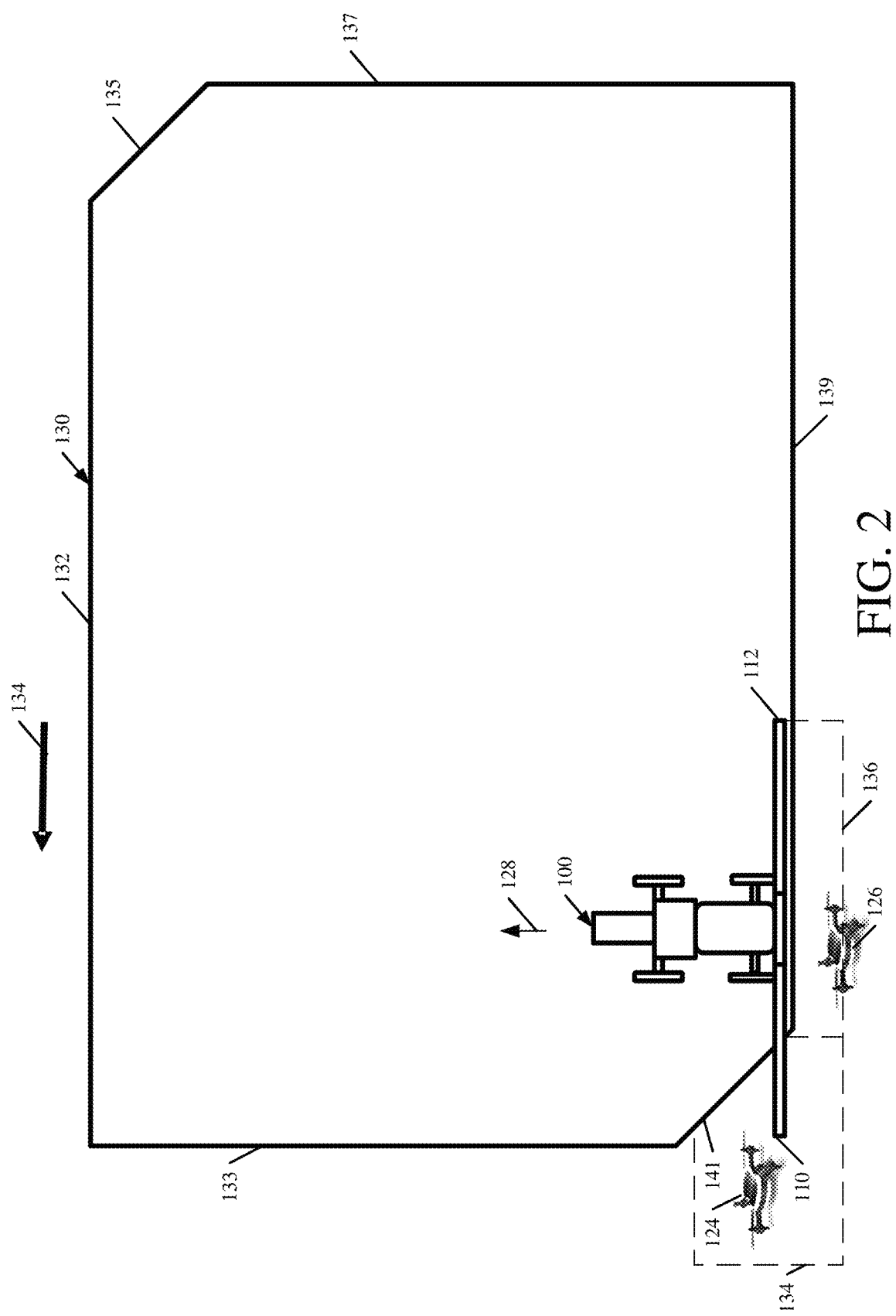
FIGS. 2-5 are pictorial illustrations showing the sprayer illustrated in FIG. 1 deployed in a field, with unmanned aerial vehicles deployed in different monitor areas based on sensed wind speed and wind direction, and based on the boundaries of the field being sprayed.

FIG. 2 is a pictorial illustration showing one example of spraying machine 100 deployed in a field 130 that is defined by a field boundary that includes boundary sections 132, 133, 135, 137, 139 and 141. Machine 100 is shown traveling across field 130 generally in a direction indicated by arrow 128.

In the example shown in FIG. 2, it is assumed that the wind direction is in the direction generally indicated by arrow 134. Also, in the example shown in FIG. 2, as agricultural spraying machine 100 begins to spray a substance from nozzles on boom arms 110 and 112, the spray may drift across the boundaries of field 130. For instance, when sprayer 100 is located in the position shown in FIG. 2, the substance may drift, because of the wind, across boundary 139 in a direction located generally behind machine 100, in the direction of travel, and across boundary 141 generally to the side of machine 100.

Therefore, as will be described in greater detail below, sensor position control logic senses the wind direction and wind speed, and also identifies the boundary of field 130, based upon field boundary data, and generates control signals to control UAVs 124 and 126 to position themselves in monitor areas where an overspray condition is most likely to happen. In the example illustrated in FIG. 2, it may be determined that it is relatively likely that an overspray condition may happen in a monitor area defined by dashed line 134 and in a monitor area defined by dashed line 136. Therefore, in one example, the sensor position control logic (described in greater detail below with respect to FIG. 7) controls UAV 124 to position it in monitor area 134, and it controls UAV 126 to position it in monitor area 136. If the substance being sprayed by sprayer 100 drifts into those areas, it will be sensed by the sensors on the UAVs and logic on the UAVs will send an overspray signal, indicative of the detected overspray condition, to an overspray detection system on sprayer 100. This is all described in greater detail below.

Figure 3:
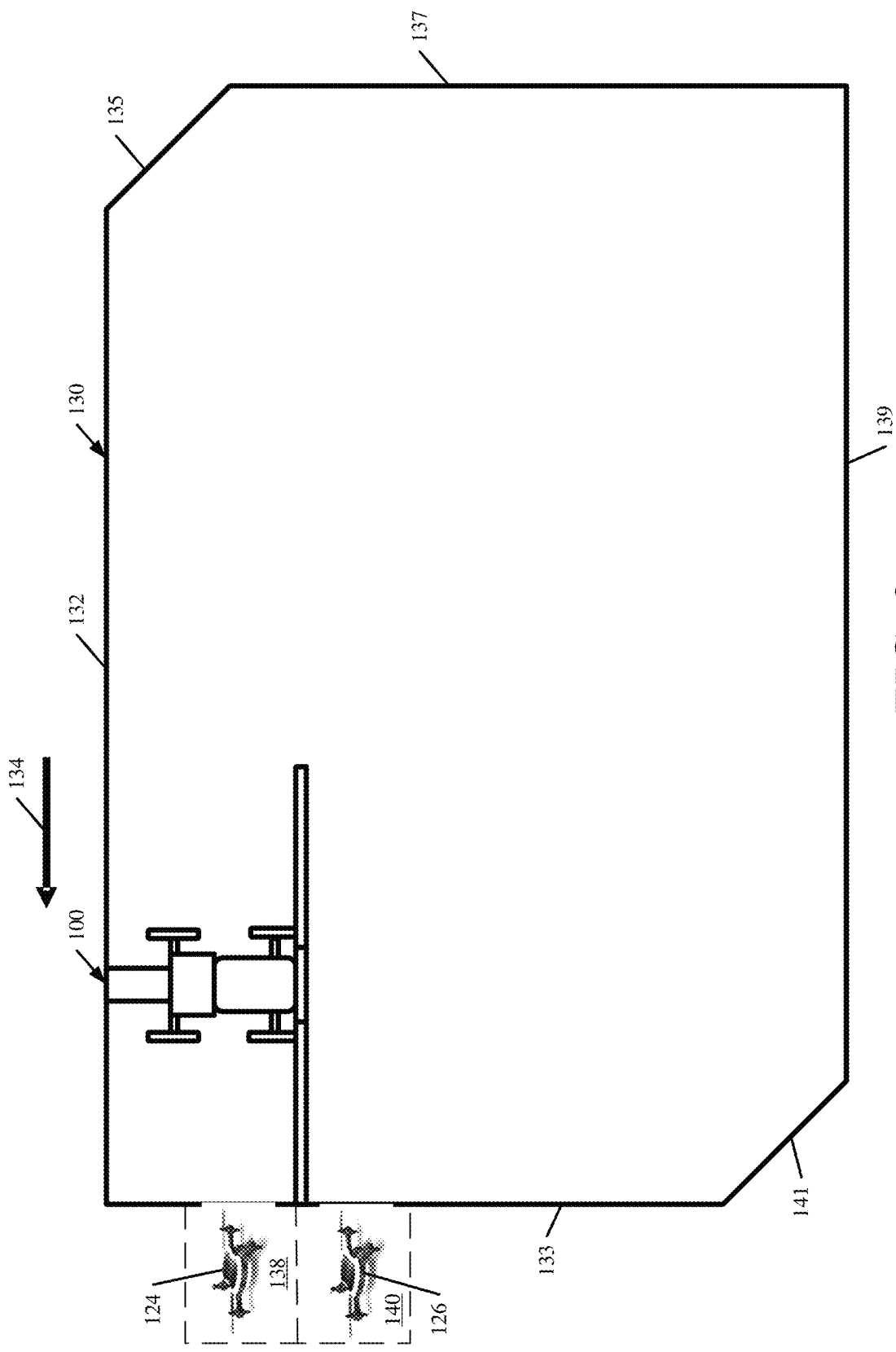

In one example, as machine 100 moves in the direction indicated by arrow 128, the sensor position control logic controls UAVs 124 and 126 to move along with machine 100, and to position themselves in other monitor areas based upon the position of machine 100, the wind direction indicated by arrow 134, the wind speed, etc. FIG. 3 shows one example of this.

Some items shown in FIG. 3 are similar to those shown in FIG. 2, and they are similarly numbered. It can be seen in FIG. 3 that machine 100 has now traveled to be closely proximate field boundary 132, but the wind direction is still in the same direction as indicated by arrow 134. Therefore, any likely overspray is illustratively determined to occur in monitor area 138 and in monitor area 140. Thus, UAVs 124 and 126 are controlled to position themselves in those two monitor areas.

Figure 4:
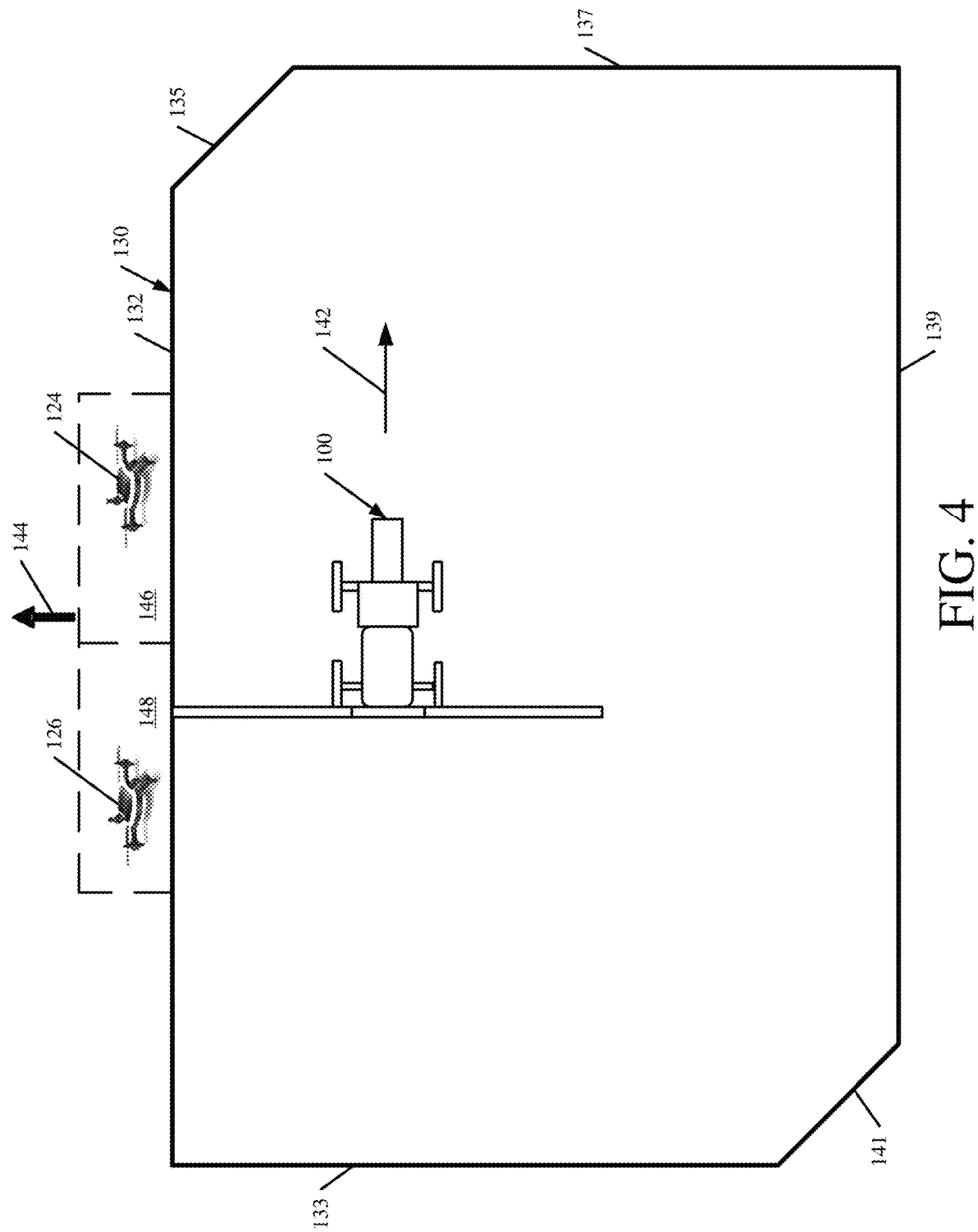

FIG. 4 shows that machine 100 has now turned to travel in a direction generally indicated by arrow 142. In addition, the wind direction has now shifted to the direction indicated by arrow 144. Thus, the overspray (in which the sprayed substance crosses the field boundary 132 of field 130) is now likely to occur in monitor areas 146 and 148. Therefore, UAVs 124 and 126 are controlled to position themselves in those two monitor areas, respectively.

Figure 5:
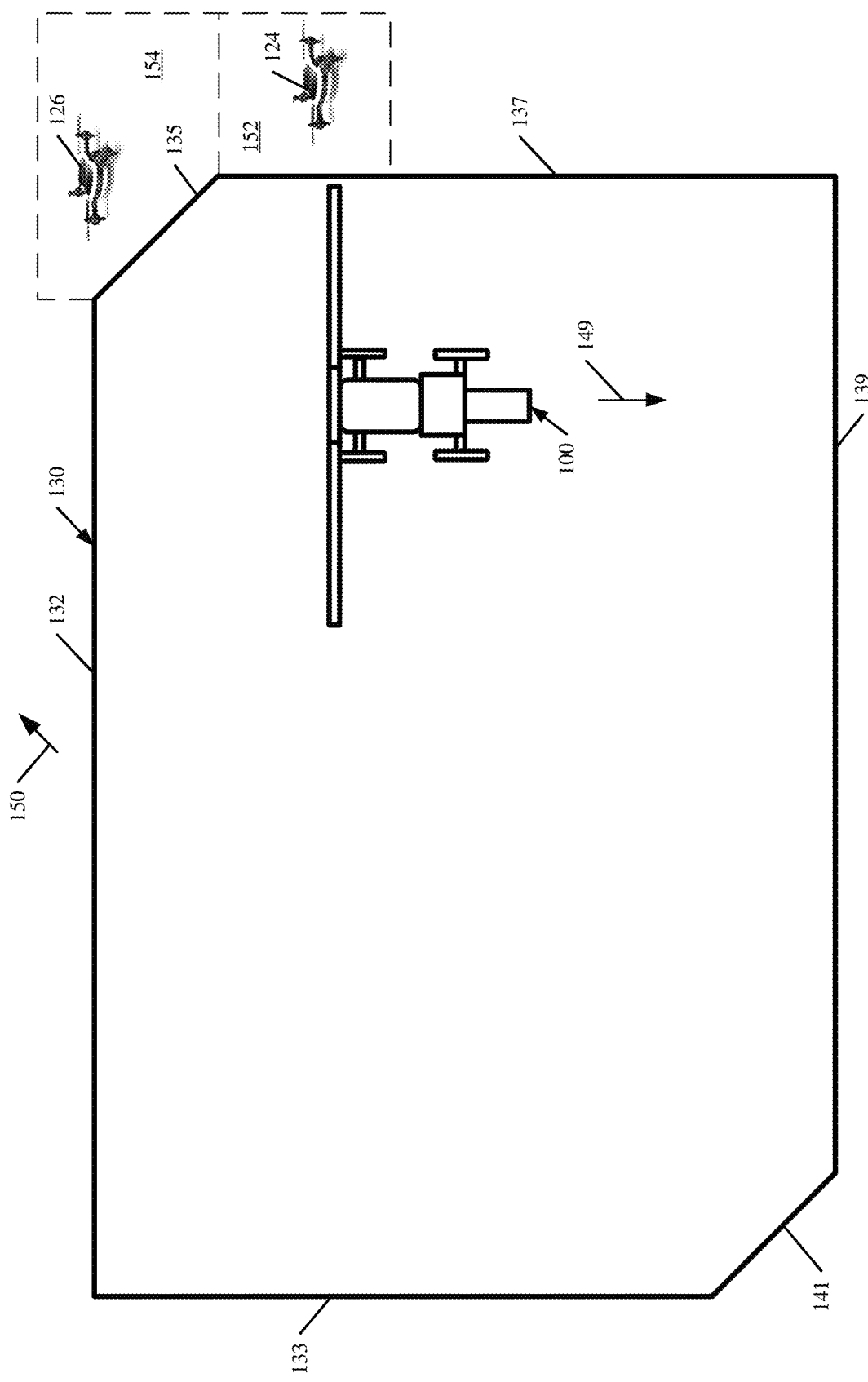

FIG. 5 shows that machine 100 has now again turned to move in the direction indicated by arrow 149. Also, the wind direction has shifted to that shown by arrow 150. Therefore, it is determined that an overspray condition may occur in monitor areas 152 and 154. Thus, control signals are generated to control UAVs 124 and 126 to position them in monitor areas 152 and 154, respectively.

Before describing the operation of sprayer 100 and UAVs 124 and 126 in more detail, a number of other items will first be noted. In one example, it may be that sprayer 100 is traveling through the middle of field 130. In that case, it may not be near a field boundary. Therefore, it may be determined that there is no monitor zone that needs to be monitored, because there is no relatively high likelihood that an overspray condition may exist. This may also happen when the wind speed is relatively low, when the substance being sprayed is relatively heavy and resistant to drift, or for other reasons. In those instances, then UAVs 124 and 126 can be controlled to return to machine 100 where they can be carried by sprayer 100 and/or recharged, assuming they are coupled to machine 100 using a wireless connection.

In addition, some sprayers 100 may take on the order of 30 minutes to spray a full tank of material. Sprayer 100 may then be refilled by a refill machine. During that time, UAVs 124-126 may also return to spraying machine 100 where they can be recharged, or where the batteries or other power cells can be swapped for charged batteries or power cells.

Figure 6A:
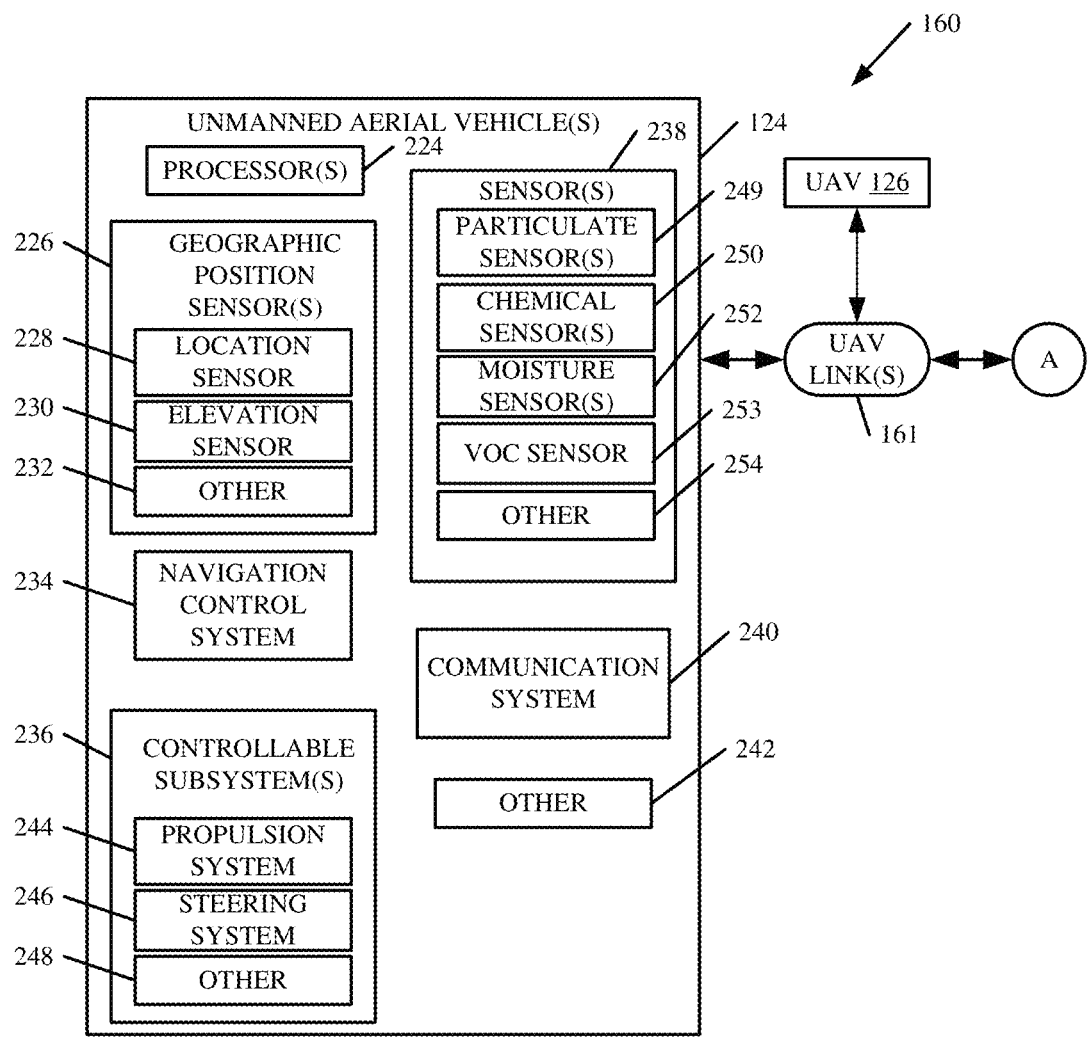
FIGS. 6A-C (collectively referred to herein as FIG. 6) are a block diagram showing one example of a spraying architecture.
Figure 6B:
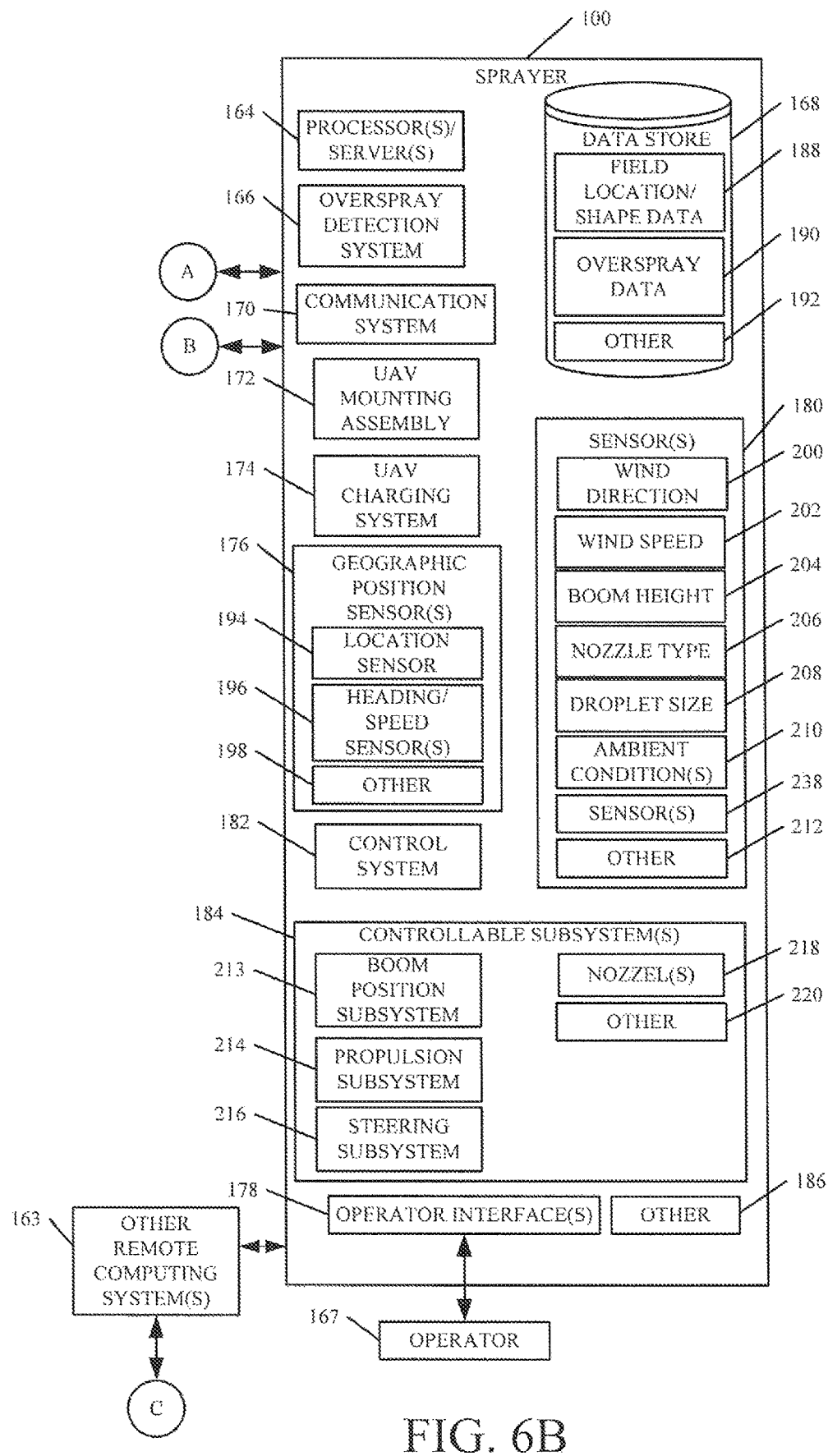
Figure 6C:
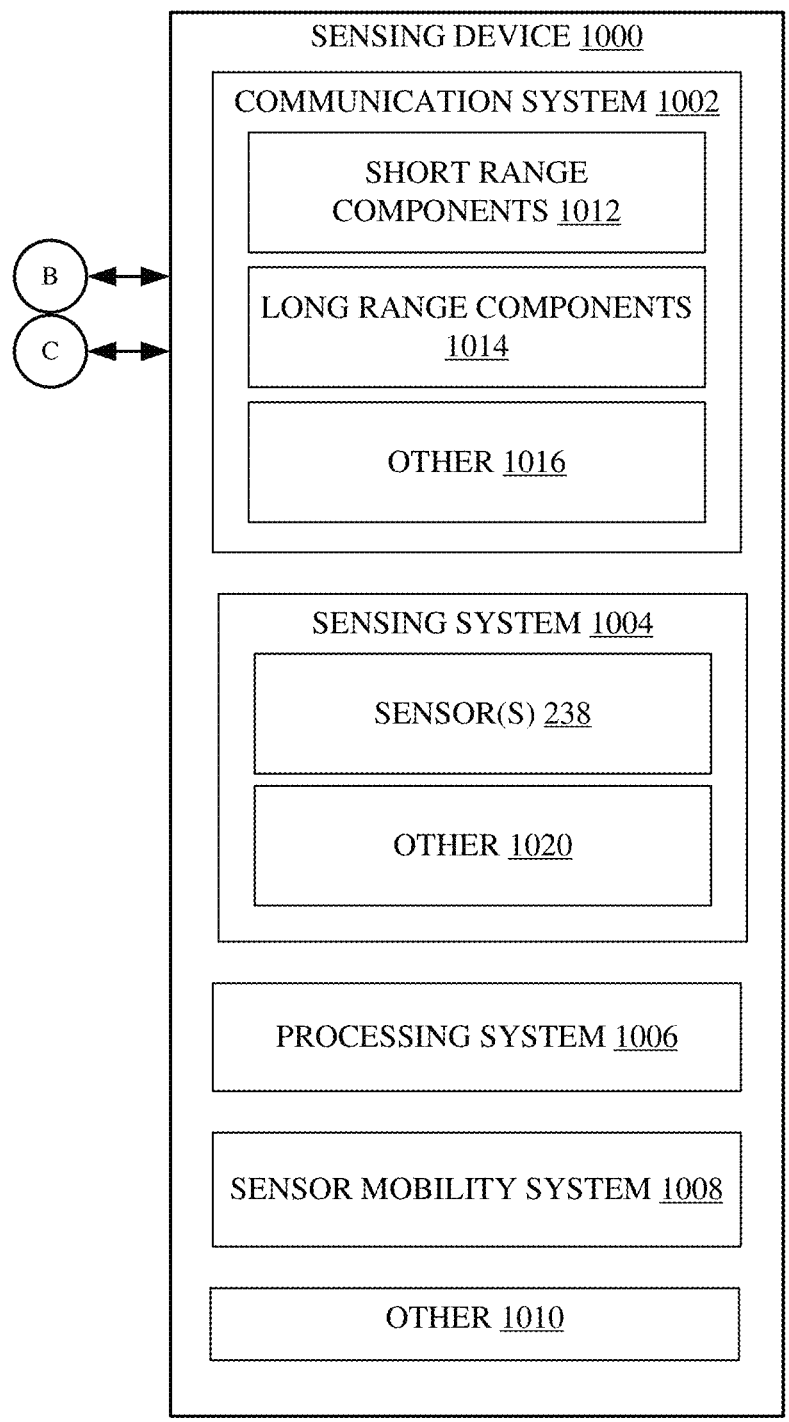

FIGS. 6A-6C (collectively referred to herein as FIG. 6) illustrate a block diagram showing one example of a spraying architecture 160 that shows sprayer 100 coupled to UAVs 124-126 and/or other sensing devices 1000 and/or other computing systems 163 (which may be remote server systems, farm manger systems, etc.). It should be noted that, architecture 160 can include a sprayer computing system that can be disposed on sprayer 100, and it can also include a single unmanned aerial vehicle (such as one of UAVs 124 and 126) or more UAVs. The UAVs 124 and 126 can be similar or different. For purposes of the present description, it will be assumed that they are similar so that only UAV 124 is described in more detail. This is only one example.

UAV 124 illustratively includes one or more processors 224, one or more geographic position sensors 226 (which can include a location sensor 228, an elevation sensor 230, and a wide variety of other sensors 232), navigation control system 234, one or more controllable subsystems 236, one or more sensors 238, a communication system 240, and a wide variety of other items 242. Controllable subsystems 236 can include a propulsion system 244, a steering system 246, and other items 248. Sensors 238 can include a particulate sensor 249, a chemical sensor 250, a moisture sensor 252, and/or other sensors 254. They can be volatile organic compound (VOC) sensors 253, or other sensors.

Links 161 can be tethered links, or wireless links. If they are tethered links, they can provide power and control signals as well as other communication signals between UAVs 124-126 and sprayer 100. They can provide similar or different signals if UAV links 161 are wireless links. All of these arrangements are contemplated herein.

In the example shown in FIG. 6, sprayer 100 illustratively includes one or more processors or servers 164, overspray detection system 166, data store 168, communication system 170, UAV mounting assembly 172, UAV charging system 124, one or more geographic positioning sensors 176, operator interfaces 178 (that are provided for interaction by operator 163), one or more other sensors 180, control system 182, controllable subsystems 184, and it can include other items 186. Data store 168 can include field location/shape data 188 which can describe the shape or boundaries of one or more different fields. Data store 168 can include overspray data 190 which can include a wide variety of different types of data that are collected and stored when an overspray condition is detected. Data store 168 can include a wide variety of other items 192 as well.

Geographic position sensors 176 can include a location sensor 194 (which can be a GPS receiver, a cellular triangulation sensor, a dead reckoning sensor, etc.), a heading and speed sensor 196 that senses the heading and speed of sprayer 100, and it can include a wide variety of other geographic position sensors 198. Other sensors 180 can illustratively include wind direction sensor 200, wind speed sensor 202, boom height sensor 204 which senses the height of the boom on sprayer 100, nozzle type sensor 206 which senses or indicates the type of nozzle being used on the sprayer, droplet size sensor 208 which can sense or derive a droplet size (or granule size) of the substance being sprayed by sprayer 100, ambient condition sensor 210 which can sense such things as temperature, atmospheric pressure, humidity, etc. Sensors 180 can include a wide variety of other sensors 212 as well.

Controllable subsystems 184 are illustratively customized by control system 182. They can include boom position subsystem 213, a propulsion subsystem 214, steering subsystem 216, nozzles 218, and a wide variety of other subsystems 220.

Briefly, in operation, UAVs 124 and 126 can be carried by sprayer 100 on UAV mounting assembly 172. In one example, assembly 172 has an actuatable connector that releasably connects UAVs 124 and 126 to sprayer 100. When actuated, it illustratively releases UAVs 124 and 126 so that they can be flown to other positions. UAV charging system 174 charges batteries on UAVs 124 and 126, when they are battery operated. Geographic position sensors 176 illustratively sense the geographic location, heading and speed (or route) of sprayer 100. Wind direction sensor 200 and wind speed sensor 202 illustratively sense the direction and speed of the wind. Field location/shape data 188 illustratively defines the shape and location of a field that sprayer 100 is treating or is to treat. Overspray detection system 166 illustratively detects when sprayer 100 is approaching a likely monitor area, where an overspray condition may likely occur. When this happens, it illustratively generates control signals to launch UAVs 124-126 from UAV mounting assembly 172 so that they are positioned in the monitor areas. Also, as sprayer 100 moves, overspray detection system 166 illustratively provides signals to navigation control system 234 on the UAVs 124-126 to control their position so that they follow along with sprayer 100, in monitor areas where an overspray condition is likely to exist, based upon the movement or changing position of sprayer 100. This is described in greater detail below.

Overspray detection system 166 illustratively receives one or more signals from UAVs 124, 126 and/or other sensing devices 1000 indicating detection of an overspray condition. This means that the substance being sprayed by sprayer 100 has crossed the field boundary of the field being treated and is sensed by sensors 238 on one of the UAVs or other sensing devices 1000 when they are positioned in monitor areas. The signal can be received through communication system 170 which can be any of a wide variety of different types of communication systems that can communicate with UAVs 124, 126 over UAV links 161 or with other sensing devices 1000.

When an overspray condition is detected, overspray detection system 166 illustratively controls data store 168 to store a wide variety of different types of overspray data, some of which will be described in greater detail below. Control system 182 also illustratively generates control signals to control various controllable subsystems 184 and operator interfaces 178. It can control operator interfaces 178 to notify operator 163 that an overspray condition has been detected. It can control propulsion system 214 and steering system 216 to control the direction and speed of sprayer 100. It can control nozzles 218 to control spraying characteristics of the nozzles, or to shut them off entirely. It can control the boom height and/or other subsystems as well, such as to inject drift retardant into the substance being sprayed, among other things.

Navigation control system 234 on UAV 124 illustratively receives navigation signals through communication system 240 which communicates with communication system 170 on sprayer 100 over UAV links 161. The navigation control system 234 then generates control signals to control propulsion system 244 and steering system 246 on UAV 124 in order to position UAV 124 in a monitor area where an overspray condition is likely.

Sensors 238 generate sensor signals indicative of sensed items. They can include volatile organic compound (VOC) sensors or other sensors. Particulate sensor 249 is configured to sense the presence (and perhaps quantity) of particulate matter. Chemical sensor 250 is illustratively configured to sense the presence (and possibly quantity) of a chemical in the substance being sprayed by sprayer 100. Moisture sensor 252 is configured to sense the presence (and possibly quantity) of moisture. Any or all of these or other sensors can be used to detect the substance being sprayed by sprayer 100. There are a wide variety of different types of sensors that can be used for this. For instance, in one example, a dielectric material is used so that when moisture is on the surface of sensor 252, it changes the capacitance of a sensing capacitor on sensor 252. Particulate sensor 249 may be an optical sensor with a light emitting diode (or other radiation source) and a radiation detector. It illustratively detects particulate matter passing between the radiation source and the radiation detector. The particulate sensor 249 may also sense droplets of moisture.

Chemical sensors 250 may illustratively be a chemical sensor which senses the presence of a particular chemical. Sensors 238 can be LIDAR or laser-type sensors which sense the presence of moisture or particulates, or sensors 238 can include a combination of different types of sensors. A volatile organic compound sensor 253 can sense material that is indicative of overspray or drift or material being applied by a machine 100. This can be done in a number of ways. For example, an outdoor baseline VOC reading may be taken (which may be 0-100 ppm, for example), while in the presence of overspray the VOC reading may spike (to over 1000 ppm, for example). Volatile organic compound sensors 253 come in a variety of different types. In one example, the volatile organic compound sensor 253 is a micro hotplate sensor. A sample rate for the VOC sensor 253 can be chosen based on its particular application. Some examples of sample rates range from several Hz to less than 1 sample per minute. A volatile organic compound sensor can either have active or passive airflow over its sensing area.

In one example, sensors 238 illustratively provide a signal that is indicative of the presence of, and possibly an amount of (e.g., a proportion, a weight or size, or otherwise indicative of an amount of) sensed material (liquid, particulate, etc.) that is being sensed. These signals can be provided over UAV links 161 to overspray detection system 166 when an overspray condition is detected. This can be detected in a variety of different ways, such as when a threshold amount of moisture or particulate matter or chemical is detected by one or more of sensors 238.

Sensing device(s) 1000, as will be described in more detail below with respect to FIGS. 10-13, can be device(s) that carry one or more sensors 238, but which are not UAVs. For example, they can be manned or unmanned ground vehicles, they can be mountings on sprayer 100, they can be fixed or portable ground assets (like poles), or other things. Sensing device 1000 illustratively includes communication system 1002, sensing system 1004, processing system 1006, sensor mobility system 1008, and it can include a variety of other items 1010. Communication system 1002 can include short range components 1012, long-range components 1014 and other components 1016. Short range components 1012 can allow sensing device 1000 to communicate with other sensing devices 1000, sprayer 100, UAVs 124-126 and other remote computing systems 163 that are near a worksite. Short-range components 1012 may operate on a Wi-Fi, Bluetooth, radiofrequency or other near field or short-range protocol. Long-range components 1014 can allow device 1000 to communicate with sprayer 100 or systems (such as other remote computing systems 163) that may be out of range of short range components 1012. Long-range components 1014 may operate on a cellular, satellite, radiofrequency or other long-range protocol. In one example, there are several sensing devices 1000 at a particular worksite, all having short range components 1012 while one sensing device 1000 has a long-range component 1014. In such an example, the sensing devices 1000 communicate with each other through short range components 1012 and all of their combined data can be sent to another system (e.g., remote computing system 163) by the sensing device 1000 that has the long-range component 1014. This is only one example.

Sensing system 1004 illustratively includes a volatile organic compound sensor 1012 and other sensors 1020. Other items 1020 can include, among other things, additional sensors. These sensors can include GPS, altitude, humidity, temperature and other sensors. Some of these sensors may be indicative of conditions that would affect the accuracy of a VOC sensor or other sensor. For example, temperature and humidity may have an effect on the output of the VOC sensor. Thus, having a temperature and humidity sensor allows for a compensation algorithm to further refine (or compensate) the reading of the VOC sensor. This processing and other processing completed by the sensing device can be completed by processing system 1006, which can, itself, include a processor, timing circuitry, signal conditioning logic, etc. This processing can also be completed by another processing system remote from the sensing device 1000, e.g. by a processor on sprayer 100 or other remote computing system(s) 163.

Mobility system 1008 controls any movement of the sensing device 1000. Mobility system 1008 may vary based on what type of device the sensing device 1000 is. In one example, the sensing device 1000 is a semi-permanent or permanent ground asset (such as a pole). In such an example, mobility system 1008 can comprise a fixed, telescoping, articulating, or otherwise extendable or movable pole or arm that holds sensor(s) 238. In another example, the sensing device is located on the sprayer 100. In such an example, mobility system 1008 may comprise an actuator and a controllable articulating or pivoting arm driven by the actuator. In another example, the sensing device is located on a UAV or unmanned ground vehicle (UGV). In such an example, mobility system 1008 illustratively controls the steering and propulsion systems of the vehicle. In other examples, mobility system 1008 can comprise different combinations of several components. For example, the combinations can include an articulating arm on a telescoping pole that is mounted onto a vehicle, among a wide variety of other combinations.

Figure 7:
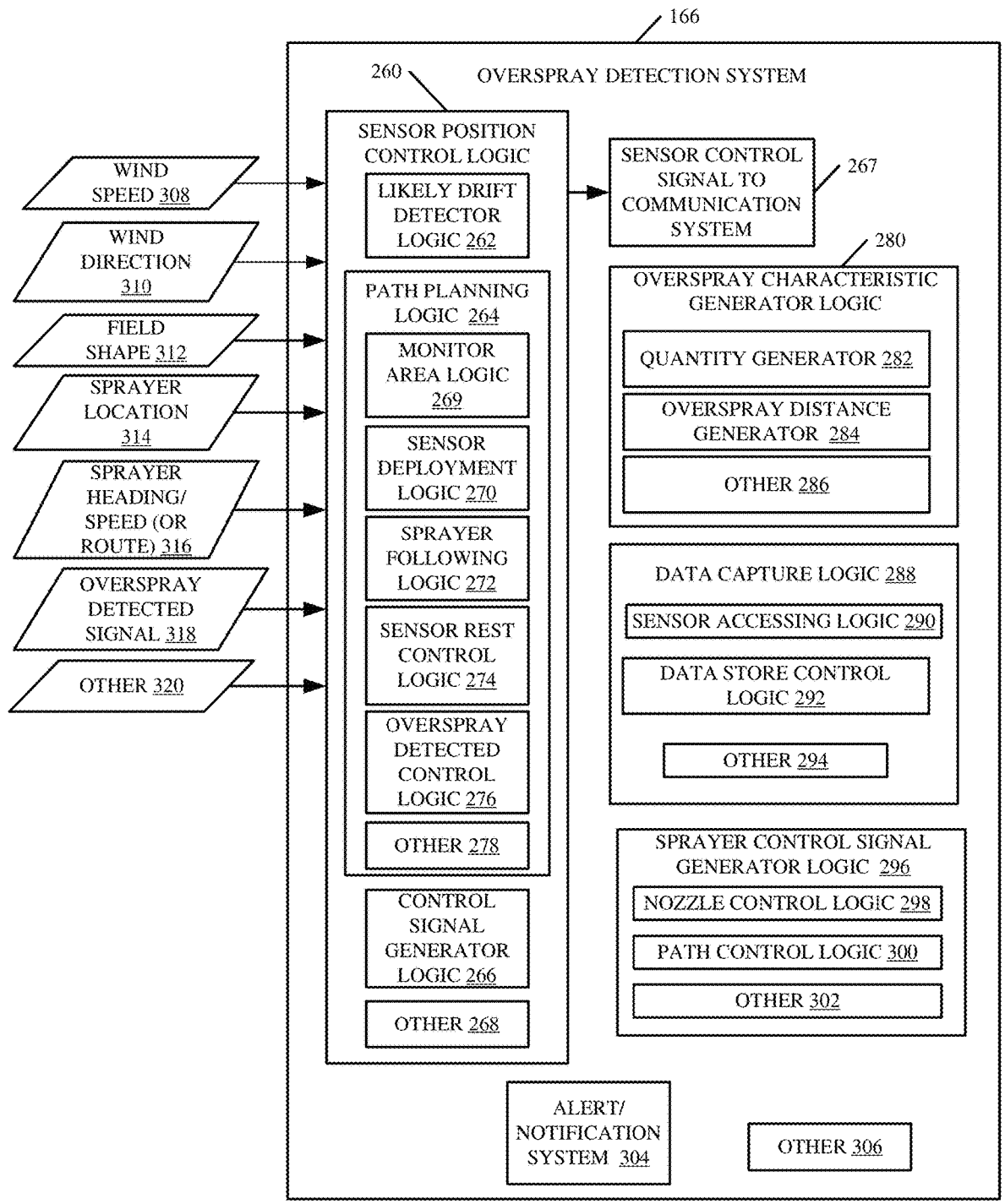
FIG. 7 is a block diagram showing one example of an overspray detection system in more detail.

A brief description of a more detailed example of overspray detection system 166 will now be provided with respect to FIG. 7. In the example shown in FIG. 7, overspray detection system 166 illustratively includes sensor position control logic 260 which, itself, can include likely drift detector 262, path planning logic 264, control signal generator logic 266, and it can include other items 268. Control signal generator logic 264 can include sensor deployment logic 270, sprayer following logic 272, sensor rest logic 274, overspray detected control logic 276, and it can include other items 278.

Overspray detection system 166 can also include overspray characteristic generator 280 (which, itself, includes quantity generator 282, overspray distance generator 284, and it can include other items 286). Overspray detection system 166 can include data capture logic 288 (which, itself, can include sensor accessing logic 290, data store control logic 292, and other items 294), sprayer control signal generator logic 296 (which, itself, can include nozzle control logic 298, path control logic 300, and other items 302), alert/notification system 304, and other items 306.

Briefly, in operation, likely drift detector 262 illustratively receives the wind speed signal 308, a wind direction signal 310, field shape data 312, sprayer location data 314, and sprayer heading/speed (or route) data 316 and other data 320. Based on this information, and possibly based on the drift characteristics of the substance being sprayed (e.g., droplet or particulate size, weight, nozzle type, boom height, sprayer speed, etc.) it detects whether sprayer 100 is approaching, or has entered, an area where the substance that it is spraying may pass over a field boundary, and therefore where an overspray condition is likely to (or may)

happen. When this is detected, it provides a signal indicative of a likely overspray condition to path planning logic 264. Monitor area logic 269 then calculates the location of one or more monitor areas where the overspray condition is likely to occur. Monitor area logic 269 can also calculate positions of potential sensors based on areas where overspray conditions are likely to occur and/or based on the sensitivity of a proximate area to the substance being sprayed. Sensor deployment logic 270 then generates signals indicative of those monitor areas and provides those signals to control signal generator logic 266. Logic 266 generates sensor control signals 267. In one example, these are recommendations of locations where an operator is to place stationary sensor devices 1000 or to pilot a manned vehicle with an attached sensor device. They can also indicate a recommended position of a movable sensor device 1000. For instance, where sensors 238 are carried on articulating on telescope arms of the sprayer 100, the sensor control signals 267 can control the arms to assure a desired position. In another example, the sensor control signals 267 are sent to UAVs 124-126 or UGVs (such as through communication system 170 and links 161) to position UAVs 124-126 or UGVs in the one or more monitor areas that have been identified by monitor area logic 169. In such a scenario, control signal generator logic 266, can also illustratively generate control signals to detach UAVs 124-126 from the mounting assembly 172 on sprayer 100, (or UGVs from an appropriate mounting assembly) so that they can move to the desired monitoring areas.

As sprayer 100 moves through the field, monitor area logic 269 (continues to identify monitor areas). Sprayer following logic 272 illustratively receives the sprayer route 316 and sprayer location information 314 as well as the identified monitor areas and/or other information. Where sensors 238 are mounted on UAVs 124-126 or UGVs, logic 272 controls UAVs 124-126 or UGVs to follow sprayer 272, positioning themselves in any monitor areas where an overspray condition is likely to happen, that may be detected by monitor area logic 269. When sensing devices 1000 are on ground assets (like poles) the sensors in the monitor) area can be activated and read.

When sprayer 100 moves to a position where there are no monitor areas identified, then sensor rest control logic 274 indicates this to control signal generator logic 266. In one example, where the sensors are on UAVs (or possibly UGVs), control signal generator logic 266 generates sensor control signals causing UAVs 124-126 (or possibly UGVs) to return to the mounting assembly 172 on sprayer 100. Therefore, the UAVs 124-126 (or possibly UGVs) are again secured to sprayer 100. In another example, sensor rest control logic 274 generates control signals causing sensor devices 1000 (that have sensors that are not being read) to go into a power saving mode that can include slowed sampling rates, fewer communications, etc.

Overspray detected control logic 276 illustratively receives an overspray detected signal 318 which is a signal from one or more of UAVs 124-126 and/or sensor devices 1000 indicating that an overspray condition has been detected. It then generates signals that are provided to control signal generator logic 266 that generates control signals to control the sensors to perform overspray operations. For example, it can control the UAVs 124-126 (or telescoping poles that hold the sensors) to change elevations or locations to determine whether the substance being sprayed is detected in the monitor area at higher or lower elevations, is detected at a position further from the field boundary, etc.

Also, once an overspray condition is detected, overspray characteristic generator 280 can detect or generate or otherwise derive characteristics of the overspray condition. Quantity generator 282 can generate a quantitative value indicative of the quantity of sprayed substance that has been oversprayed across the field boundary. This can be based upon the droplet size detected by the sensors, based upon the droplet size being sprayed or particulate matter size detected or sprayed, etc. Overspray distance generator 284 can also generate a distance value indicative of how far the overspray extended across the field boundary. This can be based on the prevailing wind conditions, the elevation of the boom on sprayer 100, the elevation of the sensor devices 1000 or UAVs 124-126 when they detected the overspray condition, etc.

Data capture logic 288 illustratively uses sensor accessing logic 290 to access various sensor data, and data store control logic 292 to control data store 168 on sprayer 100 so that it captures overspray data 190. Some examples of this are described below.

Sprayer control signal generator logic 296 can use nozzle control logic 298 to control the nozzles or the operation of the nozzles on sprayer 100. It can use path control logic 300 to change or control the path of sprayer 100 based upon the detected overspray condition. Alert/notification system 304 can control operator interfaces 178 to generate an alert or notification to operator 163 indicative of the detected overspray condition.

FIGS. 8A and 8B (collectively referred to herein as FIG. 8) illustrate a flow diagram showing one example of the operation of architecture 160 in more detail. It is first assumed that sprayer 100 is running and that it has a set of UAVs 124-126 onboard. This is indicated by block 320 in the flow diagram of FIG. 8. It will be noted that the set of UAVs can include a single UAV, or multiple UAVs (such as two UAVs indicated by block 322). The UAVs can be tethered to sprayer 100 for power and communication as indicated by block 324. They can be mounted on mounting assembly 172 and have battery or power cells being charged by UAV charging system 174. Thus, they can have a wireless connection as indicated by block 326.

Also, in one example, the sensors 238 on the UAVs are calibrated. This is indicated by block 328. For instance, readings can be taken from the sensors in clear air (where sprayer 100 is not spraying or applying any substance to a field. The sensor signals, in clean air, can be taken as a baseline value, against which other sensor measurements are compared, when they are deployed.

The sprayer can be running in other ways as well. This is indicated by block 330.

Sensor position control logic 260 then accesses the field location and shape data 188 in data store 168, as well as adjacent geography data indicative of geographic or other attributes of adjacent land. This is indicated by block 332 in the flow diagram of FIG. 8. Accessing field location data is indicated by block 334, and accessing field shape or boundary data is indicated by block 336. Accessing or retrieving adjacent geography data is indicated by block 337. The other data can be accessed as well, and this is indicated by block 338.

Likely drift detector 262 then accesses sensor signals of sensors 180 on sprayer 100 to evaluate the sensed variables that are sensed by the various sensors 180. This is indicated by block 340 in the flow diagram of FIG. 8. For instance, likely drift detector 262 can obtain wind speed data 342 from the wind speed sensor 202. It can obtain wind direction data 344 from the wind direction sensor 200. It can obtain sprayer location data 346 from location sensor 194. It can obtain sprayer heading/speed (or route) data 348 from the heading/speed sensor 196. It can obtain a wide variety of other information 350, such as characteristics of the substance being sprayed or other information as well. Based on the information from the sensors 180, likely drift detector 262 can determine whether an overspray condition is likely to happen. For instance, if the wind is strong enough, and in the right direction, and if the location of sprayer 100 is near a field boundary, this may indicate that it is likely that an overspray condition may occur. If not, processing simply reverts to block 340 where the sensor signals from sensors 180 on sprayer 100 are monitored.

If so, as indicated at block 352, then path planning logic 264 determines whether it is time to launch UAVs 124-126 (or to obtain sensor values from other sensing devices 1000, and if so controls them accordingly. For instance, monitor area logic 269 identifies the location of a monitor area where an overspray condition is likely to happen and/or a location that is more sensitive to overspray conditions. This is indicated by block 354. As discussed above with respect FIGS. 1-5, the monitor area can be an area or location of possible or likely unwanted spray drift. This is indicated by block 356. This can be defined based on the location of sprayer 100 being near a field boundary as indicated by block 358, and it can be determined in a wide variety of other ways as indicated by block 360.

If monitor area logic 269 identifies a monitor area that should be monitored for overspray (as indicated by block 362), then it provides a signal indicating this to sensor deployment logic 270, which deploys UAVs 124-126 to sensor locations, or which can activate or obtain sensor readings from other sensing devices 1000, in the monitor area that was identified. This is indicated by block 364. Sensor deployment logic 270 may illustratively provide an output to control signal generator logic 266 indicating the sensor locations. Control signal generator logic 266 then generates UAV control signals to decouple UAVs 124-126 from mounting assembly 172, to launch UAVs 124-126 and navigate them to their sensor locations in the identified monitor areas. This is indicated by block 366. In another example, control signal generator logic 266 can load a path into the navigation control system 234 on UAVs 124-126 and the UAVs, themselves, can move into the sensor locations. This is indicated by block 368. The UAVs can be deployed to the sensor locations, or other sensing devices 1000 can be deployed or activated in other ways as well, and this is indicated by block 370.

As sprayer 100 moves through the field, sprayer following logic 278 illustratively provides an output to control signal generator logic 266 indicating that logic 266 should control UAVs 124-126 to follow the sprayer, or to control other sensing devices 1000 accordingly. This can include the sprayer heading and speed (or route), the location of new monitor areas, etc.). Repositioning the UAVs or controlling other sensing devices 1000 or other sensing devices 1000 are activated as the sprayer moves is indicated by block 372.

If, while the UAVs are deployed to their sensor locations, they detect an overspray condition, as indicated by block 374, they illustratively provide a signal to overspray detection system 166 indicating that an overspray condition has been detected. In that case, overspray detection system 166 performs overspray operations, as indicated by block 376. One example of this is described in greater detail below with respect to FIG. 9.

If an overspray condition is not detected, or after the overspray operations have been performed, then UAVs 124-126 continue to move along with sprayer 100, or other sensing devices 1000 can be controlled accordingly, to sense additional overspray conditions, if they occur. This is indicated by block 378.

At some point, monitor area logic 269 will determine that sprayer 100 is not ear a monitor area that needs to be monitored, or likely drift detector 262 may detect that the conditions have changed so an overspray condition is unlikely. In that case, UAVs 124-126 or other sensing devices 1000 need not monitor for an overspray condition any longer. This is indicated by block 380. Thus, sensor rest control logic 274 provides signals to control signal generator logic 266 so that logic 266 generates UAV control signals to control the UAVs 124-126 to return them to the UAV mounting assembly 172 on sprayer 100. This is indicated by block 382 in the flow diagram of FIG. 8. In one example, UAV charging system 174 again recharges the batteries on UAVs 124-126. This is indicated by block 384. The control signals can be generated to power down other sensing devices 1000 or place them in power saving mode, as indicated by block 285. Other operations can be performed on the UAVs when they return to sprayer 100 or other sensing devices 1000 as well, and this is indicated by block 386.

Figure 8A:
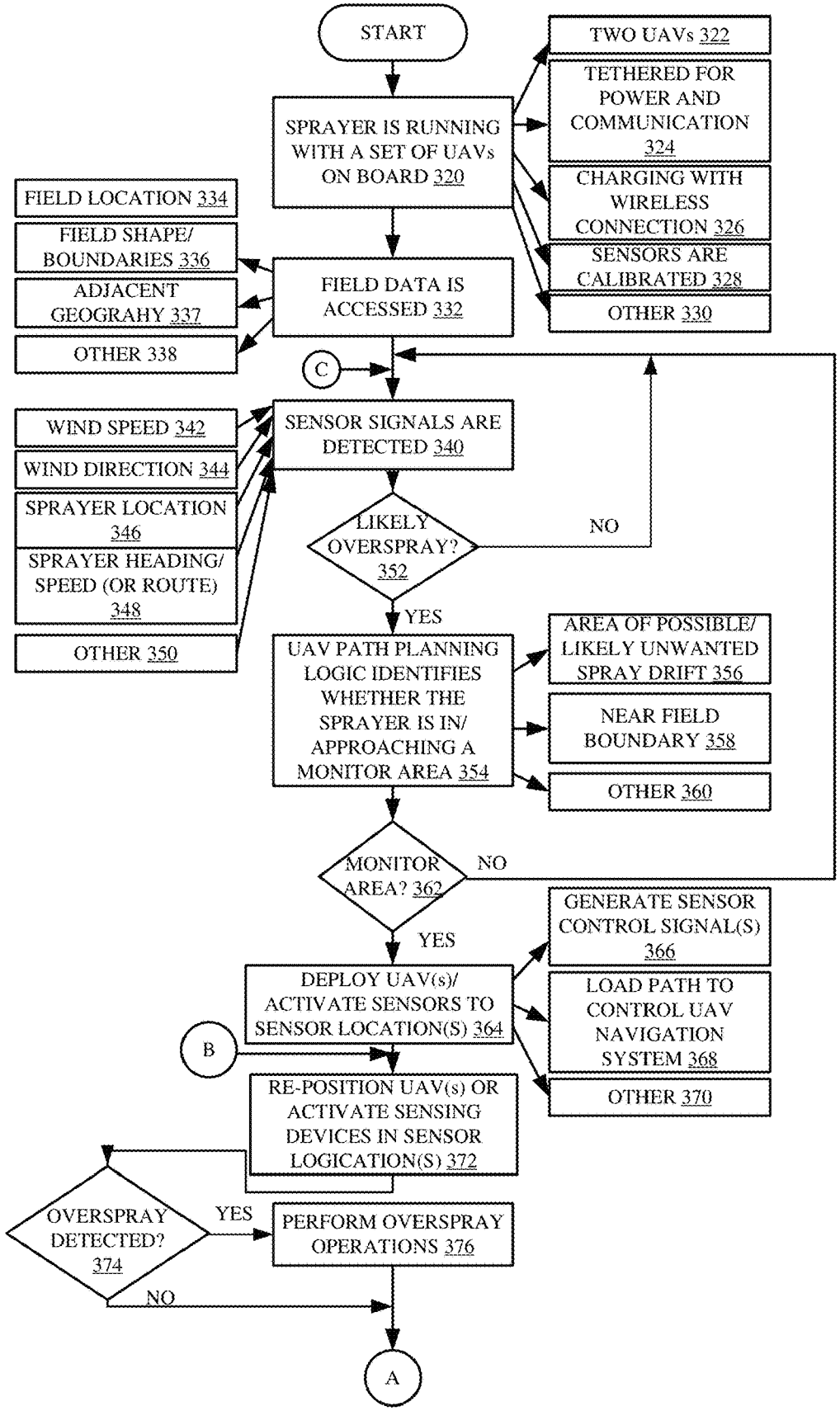
FIGS. 8A and 8B (collectively referred to herein as FIG. 8) show a flow diagram illustrating one example of the operation of the architecture illustrated in FIG. 6 in detecting an overspray condition.
Figure 8B:
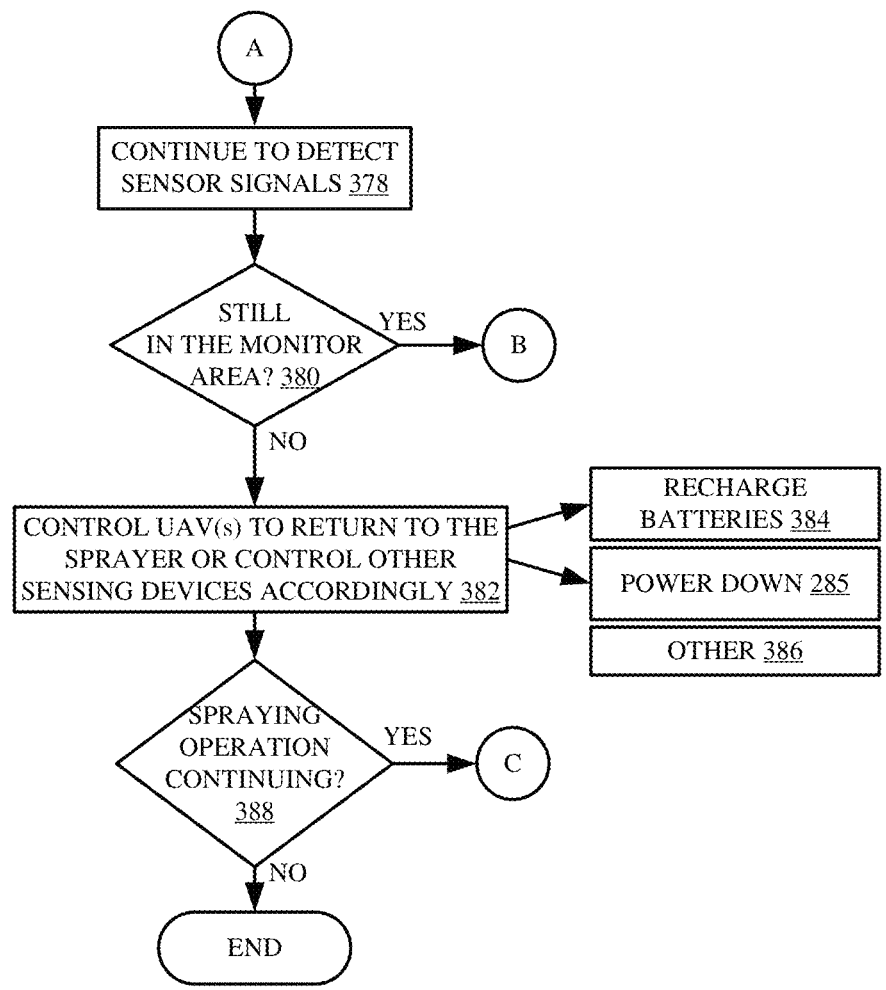

The processing in FIG. 8 can continue at block 340, where the sensor signals are detected, until the spraying operation for the current field ends. This is indicated by block 388 in the flow diagram of FIG. 8.

Figure 9:
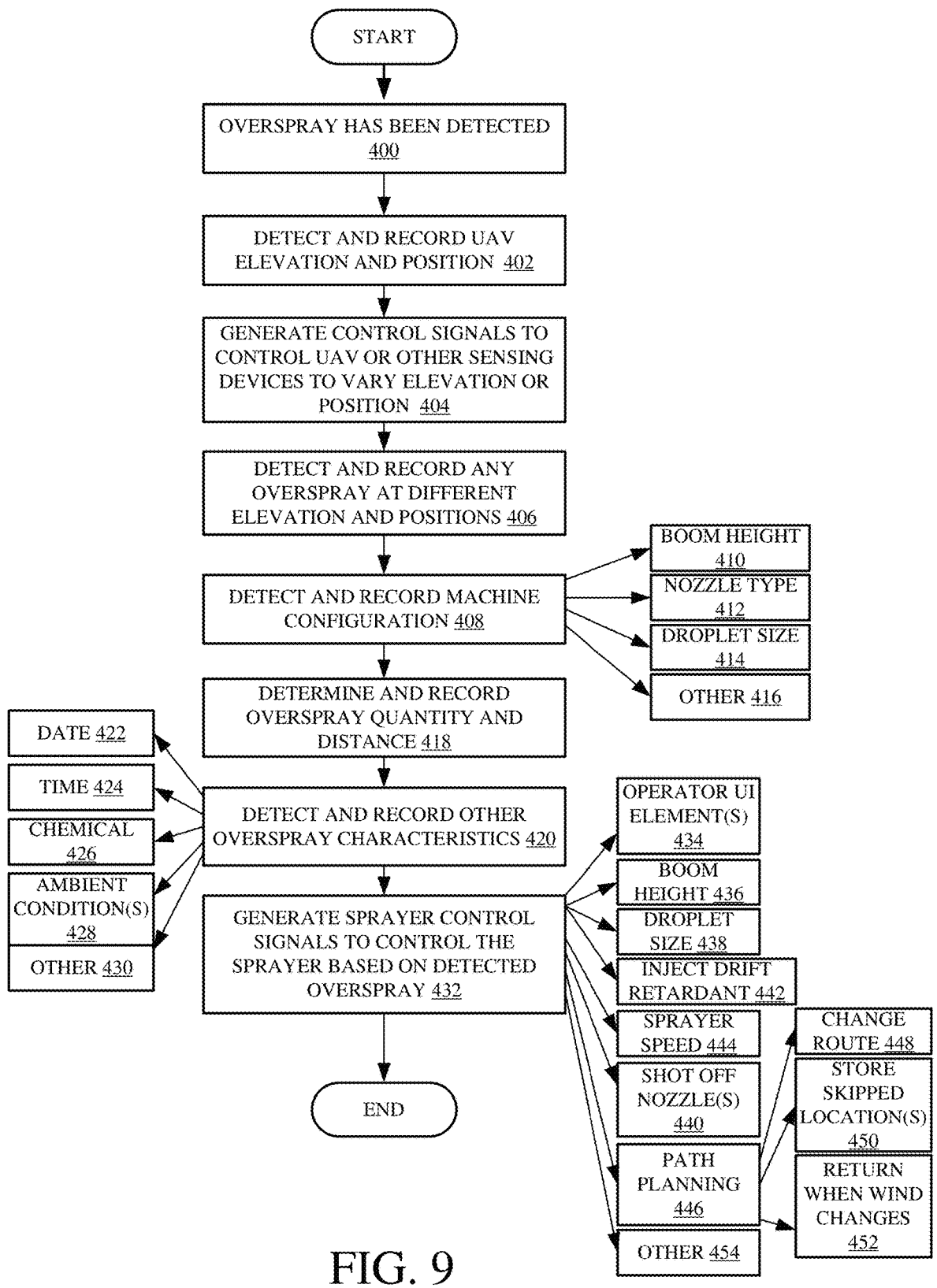
FIG. 9 is a flow diagram illustrating one example of the operation of the architecture shown in FIG. 6 in performing overspray operations, when an overspray condition is detected.

FIG. 9 is a flow diagram illustrating one example of the operation of architecture 160 (shown in FIG. 7) in performing overspray operations (as indicated by block 376 in FIG. 8). It is first assumed, for the sake of FIG. 9, that an overspray condition has been detected, and that one of the UAVs 124-126 or other sensor devices 1000 has detected the presence of a chemical or moisture in a monitor area, or other indication that an overspray has occurred in a monitor area where the sensor is positioned. This is indicated by block 400 in the flow diagram of FIG. 9.

Sensor accessing logic 290 in data capture logic 288 then accesses sensors to obtain sensor values of the sensed variables, and data store control logic 292 controls data store 168 to store those values to record that the overspray was detected and to record certain variable values corresponding to the detected overspray condition. In one example, sensor accessing logic 290 accesses the signal provided by location sensor 228 on UAV 124 (assuming UAV 124 is the UAV that sensed the overspray condition), as well as the signal value generated by elevation sensor 230. These values are indicative of the location and elevation of the UAV that detected the overspray condition. Similar sensors can be on other sensing devices 1000 and can be accessed by data store control logic 292 then controls data store 168 to store that elevation and position as part of the overspray data 190 recorded for this overspray condition. This is indicated by block 402 in the flow diagram of FIG. 9.

Overspray detected control logic 276 (in overspray detection system 166 shown in FIG. 7) can then generate signals to control the UAV (or sensor mobility system 1008 in other sensing devices 1000) to vary its elevation or position, so that the various elevations where an overspray condition is detected can be determined. Generating control signals to control the UAV or sensor mobility system to move to various elevations or positions is indicated by block 404. The sensors 238 on the UAV or other sensing devices 1000 then detect whether an overspray condition is present at the various elevations or other sensing devices. If so, the data capture logic 298 records the elevation and position of the UAV that is detecting the overspray condition. This is indicated by block 406 in FIG. 9.

Sensor accessing logic 290 can then access the sensor signals (or values indicative of the sensed variables) from a variety of different sensors, to obtain and record that information. For instance, in one example, sensor accessing logic 290 accesses machine configuration sensors to detect a variety of different machine configuration settings or characteristics. Data store control logic 292 can then store the machine configuration that exists at the time of the detected overspray condition as well. This is indicated by block 408. For instance, sensor accessing logic 290 can access boom height sensor 204 to record boom height. This is indicated by block 410. It can access nozzle type sensor or nozzle setting sensor 206 to record the nozzle type or setting of the nozzles being used on the sprayer 100. This is indicated by block 412. It can access droplet size sensor 208 to identify the droplet size of droplets being sprayed by sprayer 100. It can also generate an indication of the droplet size from the signals generated by sensors 238 on the UAV or other sensing devices 1000. Obtaining droplet size information is indicated by block 414. Logic 290 can access a wide variety of other machine configuration settings or sensors and record those as well. This is indicated by block 416.

Overspray characteristic generator 280 can then obtain or calculate or otherwise identify different characteristics of the detected overspray condition. For instance, quantity generator 282 can illustratively identify or estimate a quantity of the sprayed substance that has crossed the field boundary. This can be determined, for instance, based upon the droplet size, based upon the wind speed and wind direction, based upon the elevations at which the overspray detection is detected by the UAV or other sensing devices, based upon the boom height, or based upon a wide variety of other items. Overspray distance generator 284 can also generate an output indicative of a distance that the overspray extended across the field boundary. This can be done by positioning the UAV that detected the overspray condition further away from the field boundary until the presence of the sprayed substance is no longer detected. It can also be calculated or estimated based upon, again, the wind speed and wind direction, the boom height, the droplet size or chemical being sprayed, the various elevations at which the overspray condition was detected, among other things. Determining and recording overspray quantity and distance is indicated by block 418 in the flow diagram of FIG. 9. Data capture logic 288, or other items in overspray detection system 166 or elsewhere can also detect and record other overspray characteristics. This is indicated by block 420. For instance, they can detect the date 422, the time of day 424, the particular chemical or product being sprayed 426, ambient weather conditions 428, or other characteristics 430.

Sprayer control signal generator logic 296 can then illustratively generate control signals to control various controllable subsystems 184 on sprayer 100, based upon the detected overspray condition. This is indicated by block 432 in the flow diagram of FIG. 9. In one example, sprayer control signal generator logic 296 generates control signals to control operator interfaces 178 to show an operator user interface element (such as a warning, an alert, or another indication) indicative of the detected overspray condition. This is indicated by block 434. Sprayer control signal generator logic 296 can generate control signals to control the boom position subsystem 213 to control the boom height. This is indicated by block 436. Nozzle control logic 298 can generate control signals to control nozzles 218. For instance, it can modify the nozzles to control the droplet size of the droplets being sprayed. This is indicated by block 438. By way of example, if the droplet size is increased, it may be less likely that the substance will cross a field boundary. It can shut off the nozzles as indicated by block 440, or a subset of the nozzles (such as those closest to the field boundary). It can inject drift retardant 442 into the sprayed substance. In one example, path control logic 300 illustratively controls the sprayer speed of sprayer 100. This is indicated by block 444. In another example, path control logic 300 generates control signals to control the propulsion subsystem 214 and steering subsystem 216 of sprayer 100 to change the path or route of sprayer 100. Performing path planning is indicated by block 446. It can change the sprayer route as indicated by block 448. It can also store locations along the route of sprayer 100 where the nozzles were turned off. This is indicated by block 450. It can then control sprayer 100 to return to the spots that were skipped, when the wind changes or when other conditions change so that an overspray condition is less likely. This is indicated by block 452. It will be appreciated that a wide variety of other control signals can be generated to control other items on sprayer 100. This is indicated by block 454.

Figure 10:
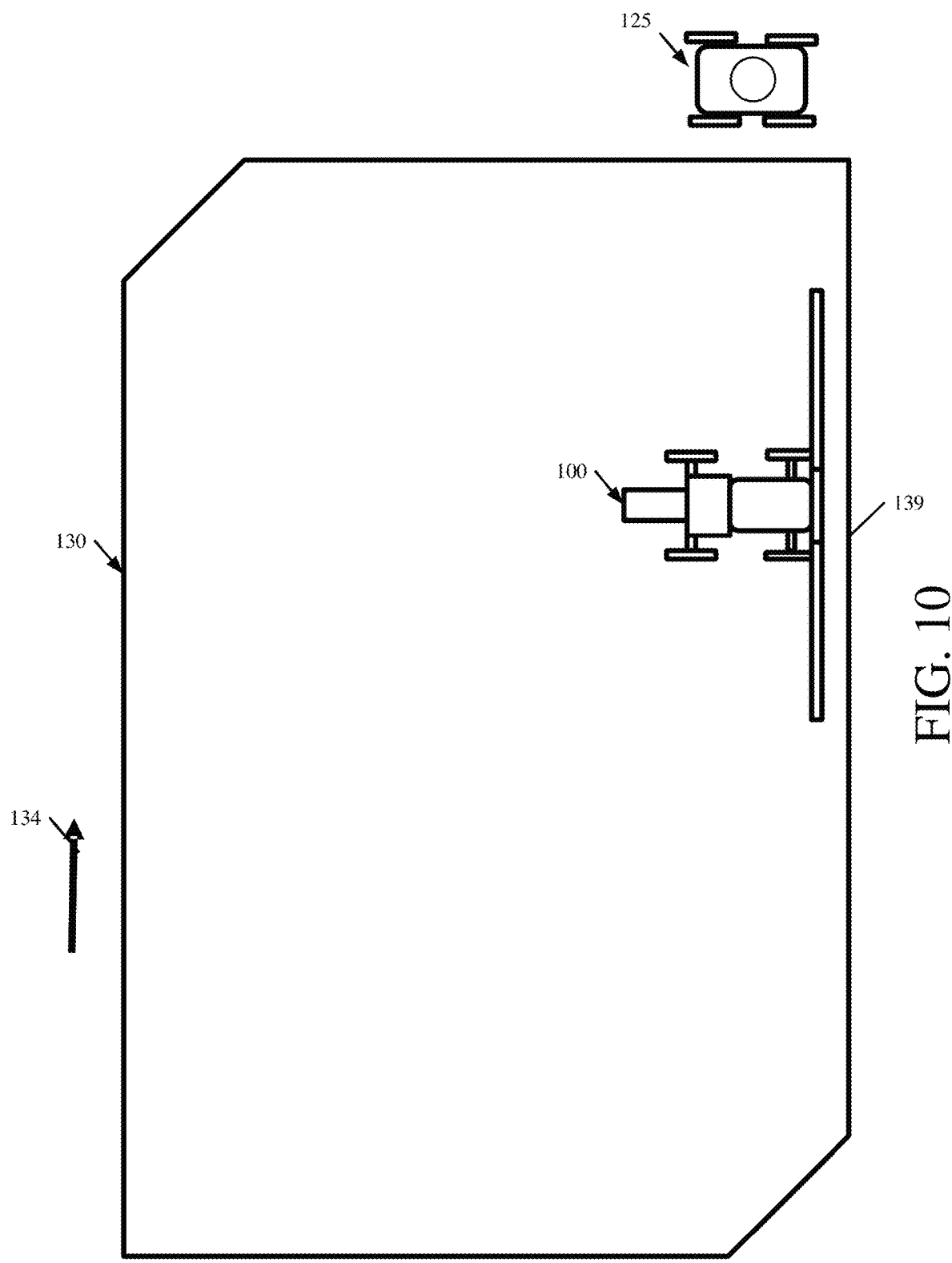
FIG. 10 is a pictorial illustration showing one example of a spraying machine deployed in a field with a ground vehicle deployed to monitor overspray.

FIG. 10 is a pictorial illustration showing one example of spraying machine 100 deployed in a field 130. Some items shown in FIG. 10 are similar to those shown in FIG. 2, and they are similarly numbered. However, the UAV of FIG. 2 is replaced in FIG. 10 with a ground vehicle 125. Ground vehicle 125 can have features/sensors that are similar to those of UAVs 124 and 126 in FIG. 2. Among these, the sensors can be overspray sensors indicative of overspray chemical from machine 100. Sensors mounted on ground vehicle 125 can be mounted on height adjusting or articulating arms so that sensor readings can be taken from multiple different altitudes or positions. Also, there may be multiple ground vehicles 125, each with a sensor, that can be positioned, like the UAVs 124, 126 are positioned, or they can be positioned differently. Ground vehicle 125 may either be unmanned (UGV) or manned. Some examples of manned ground vehicles include utility vehicles, trucks, tractors, ATVs, etc.

Figure 11:
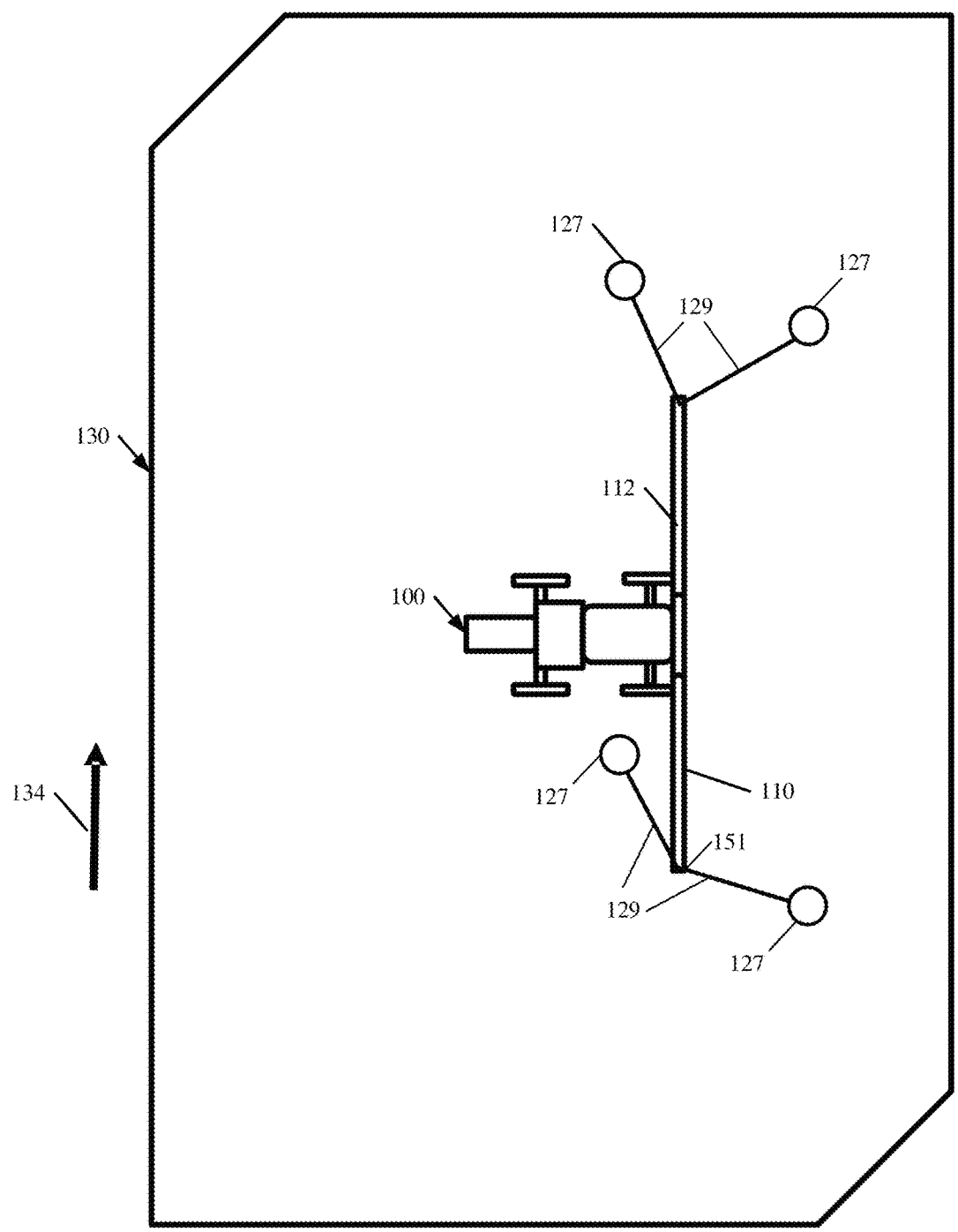
FIG. 11 is a pictorial illustration showing one example of a spraying machine coupled to overspray sensors deployed in a field.

FIG. 11 is a pictorial illustration showing one example of spraying machine 100 deployed in a field 130. In this example, there are overspray sensors 127 coupled to the machine 100. Overspray sensors 127 can be mounted on arms 129 which are coupled to boom arms 110 and 112. Arms 129 can articulate or pivot about points 151, they can telescope or otherwise move. They can be moved manually or by controlling one or more actuators in a sensor mobility system 4008 (shown in FIG. 6). The actuators can be controlled automatically or manually as well. Control of arms 129 can be based upon similar factors that determine appropriate locations of UAVs 124-126, discussed above. For example, the wind may be in the direction generally indicated by arrow 134, in which case the arms 129 can move overspray sensors 127 into a position downwind of the spray nozzles on boom arms 110 and 112. Of course, arms 129 can be stationary and located at predetermined overspray locations as well.

Figure 12:
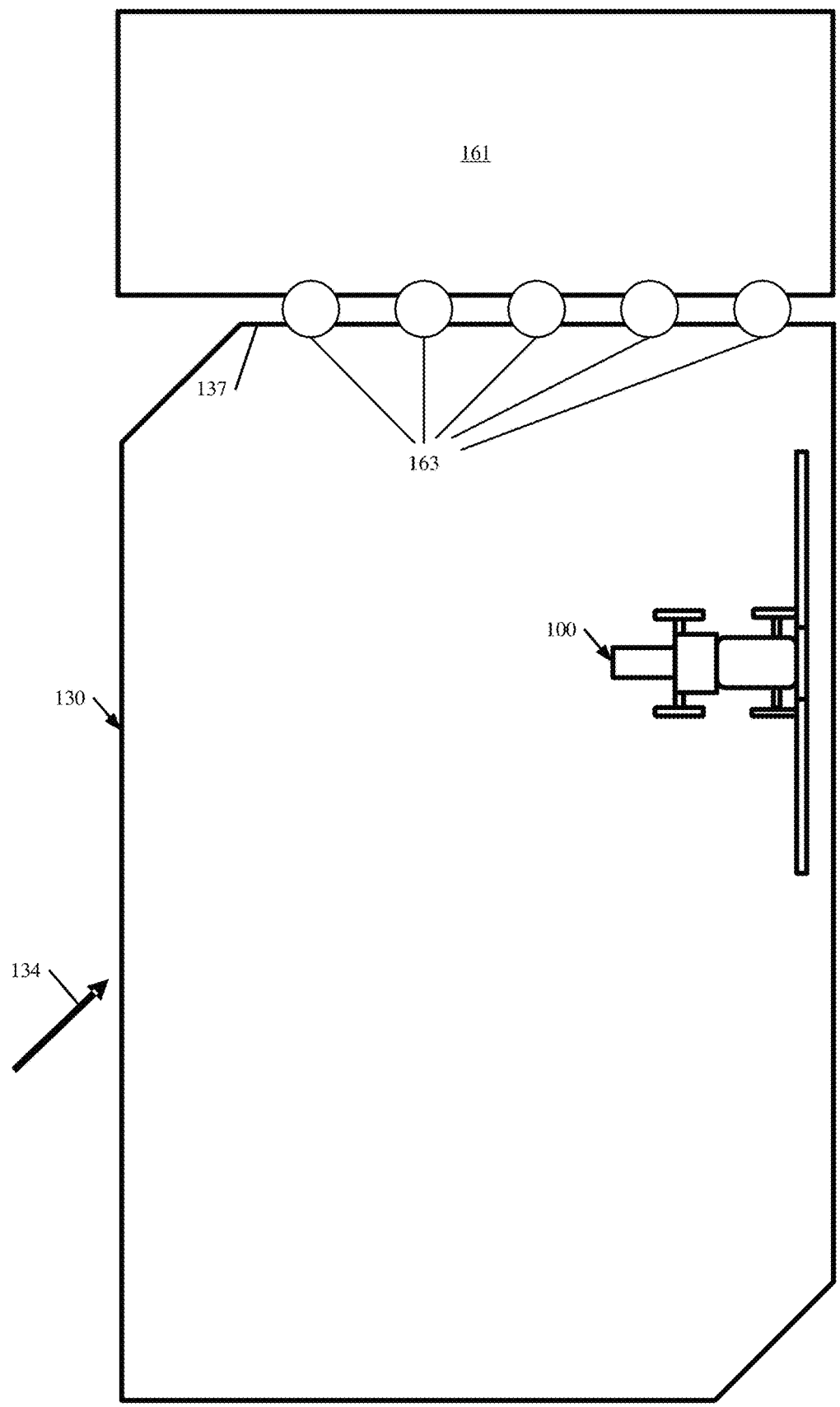
FIG. 12 is a pictorial illustration showing one example of a spraying machine deployed in a field with ground based sensors deployed to monitor overspray.

FIG. 12 is a pictorial illustration showing one example of spraying machine 100 deployed in a field 130. Some items shown in FIG. 12 are similar to those shown in FIG. 2, and they are similarly numbered. Field 130 is defined by boundaries 132-141. Along boundary 137 is an area of sensitivity 161. Area of sensitivity 161 is an area that is sensitive to overspray from machine 100. Examples of areas of sensitivity 161 include residential areas, fields containing plants sensitive to sprays, organic certified fields, etc. When a known area of sensitivity 161 exists, sensors 163 may be placed along the adjacent edge of field 130, to help identify if overspray is leaving field 130 in the direction of area of sensitivity 161. Sensors 163 can be mounted to fixed, permanent, semi-permanent or mobile structures. For instance, sensors 163 can be mounted to fixed or movable poles or other ground-based elements or structures. The permanent or semi-permanent structures can support the sensors so they have some types of mobility. For instance, the structures can have the sensors mounted on articulating, telescoping, or extending arms, etc. The movement of the arms can be driven manually or automatically, by actuators or other mechanisms in sensor mobility system 1008, or elsewhere.

Figure 13:
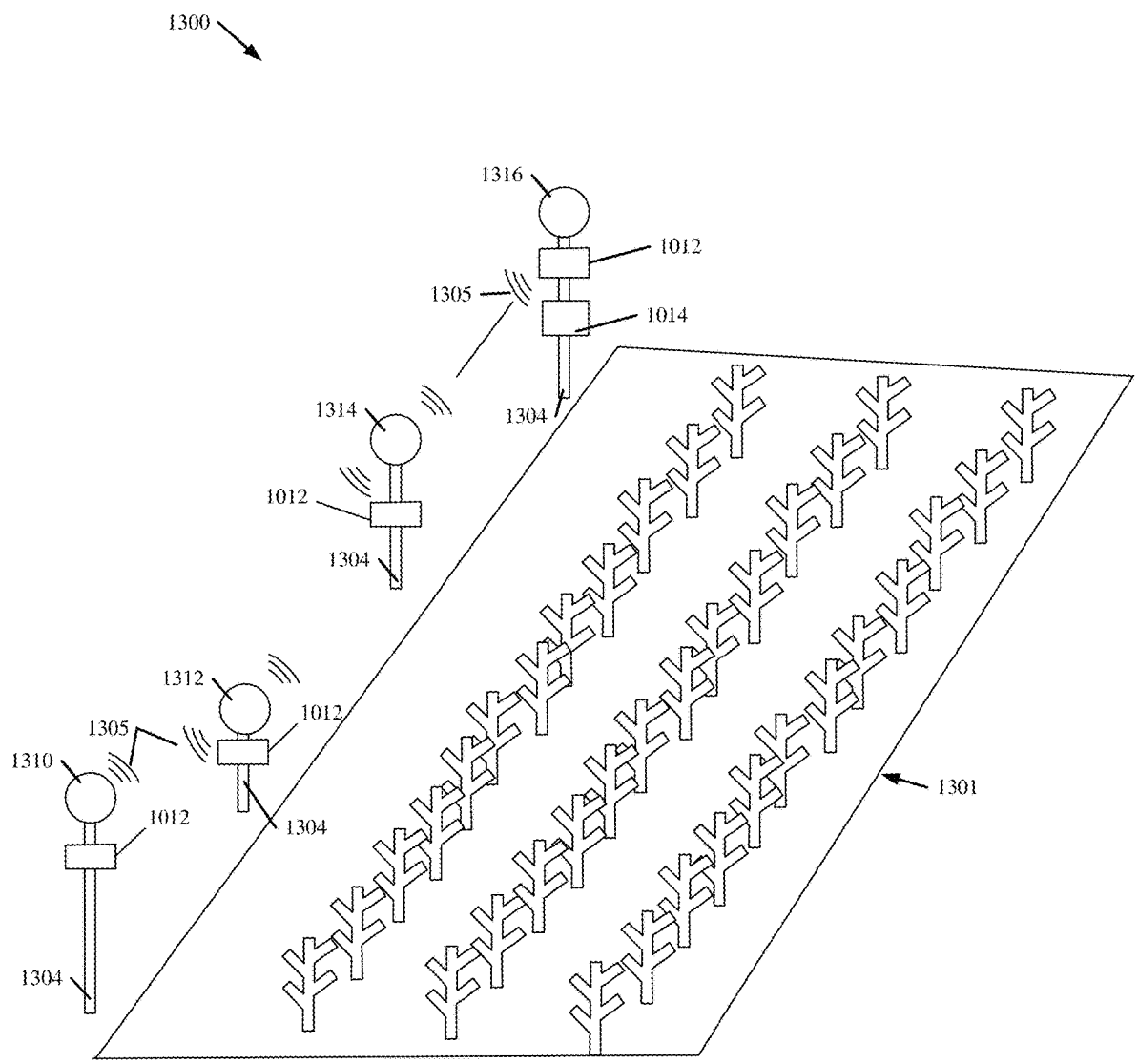
FIG. 13 is a pictorial illustration showing one example of an arrangement of ground based sensors deployed to monitor overspray

FIG. 13 is a pictorial illustration showing one example of overspray sensors deployed in a worksite. Worksite 1300 comprises an agricultural field 1301. In the example shown, there are four overspray sensors 1310, 1312, 1314, and 1316. These sensors are mounted on arms 1304. Arms 1304 may be permanently installed into the ground or they can be portable. Arms 1304 in one example, have an adjustable height and/or articulate to accommodate for different scenarios. For instance, in the example shown, sensor 1312 is lower than sensor 1310. The height, spacing and quantity of sensors in FIG. 13 may be modified for differing conditions. For example, if an area adjacent to field 1301 is more hypersensitive to chemicals being sprayed, more sensors can be spaced close together at varying heights to monitor overspray.

FIG. 13 also shows that sensors 1310, 1312, 1314 and 1316 can include short range communication components 1012 so they are in short range communication with one another as indicated by signal 1305. FIG. 13 also shows that at least one of them (e.g., sensor 1316) can include a long-range communication components 1014 that can communicate data received from all of the sensors (using short range communication components 1012) to a location that is remote from worksite 1300. Such as a remote computing system 163, sprayer 100, UAVs, UGVs or other sensors or systems. Long-range communication component 1014, as described above, can operate on a cellular, satellite or other long-range communication protocol.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 14:
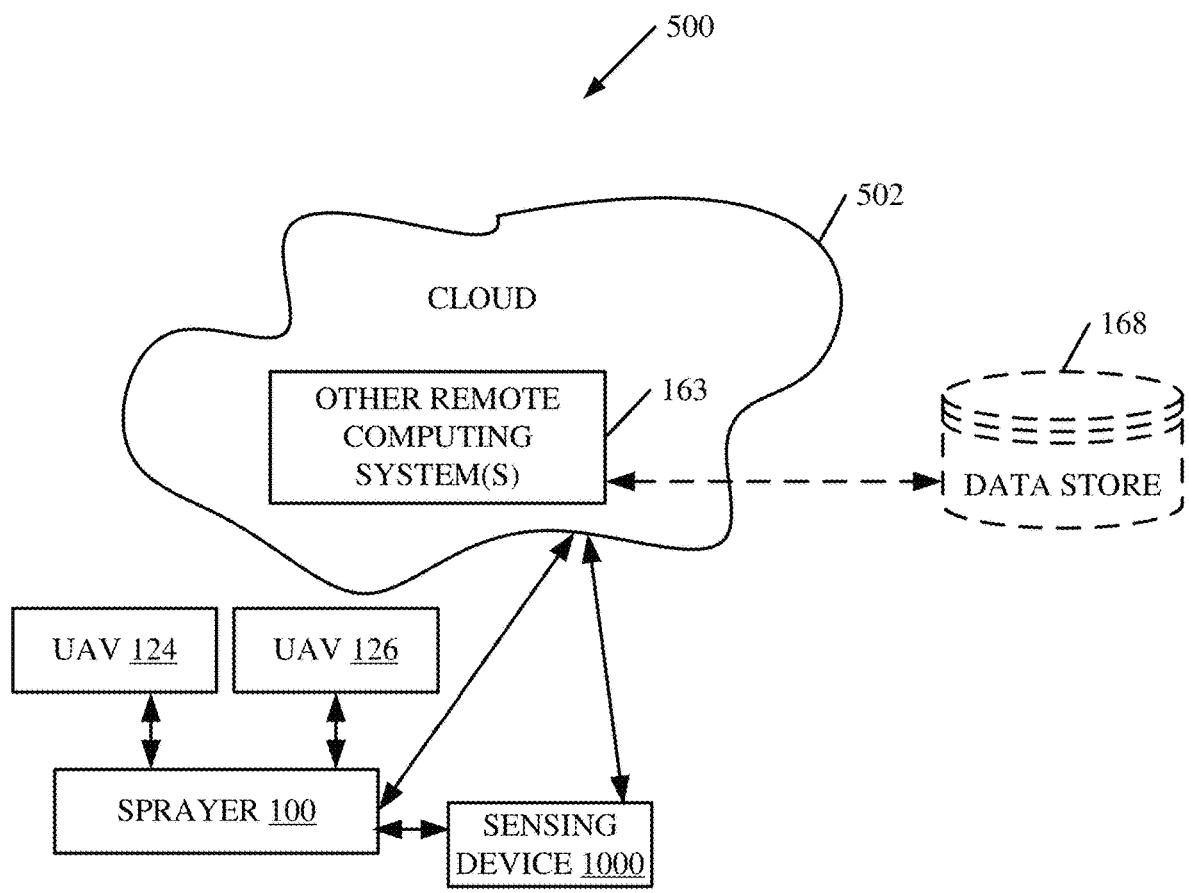
FIG. 14 is a block diagram showing the architecture illustrated in FIG. 6 deployed in a cloud computing environment.

FIG. 14 is a block diagram of sprayer 100, shown in FIG. 6, except that it communicates with elements in a remote server architecture 500. In an example remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 6 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 14, some items are similar to those shown in FIG. 6 and they are similarly numbered. FIG. 14 specifically shows that remote systems 163 can be located at a remote server location 502. Therefore, sprayer 100 accesses those systems through remote server location 502.

FIG. 14 also depicts another example of a remote server architecture. FIG. 14 shows that it is also contemplated that some elements of FIG. 6 are disposed at remote server location 502 while others are not. By way of example, data store 168 can be disposed at a location 502 or separate from location 502, and accessed through the remote server at location 502. Regardless of where they are located, they can be accessed directly by sprayer 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the sprayer comes close to the fuel truck for fueling, the system automatically collects the information from the sprayer using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the sprayer until the sprayer enters a covered location. The sprayer, itself, can then send the information to the main network.

It will also be noted that the elements of FIG. 6, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 15:
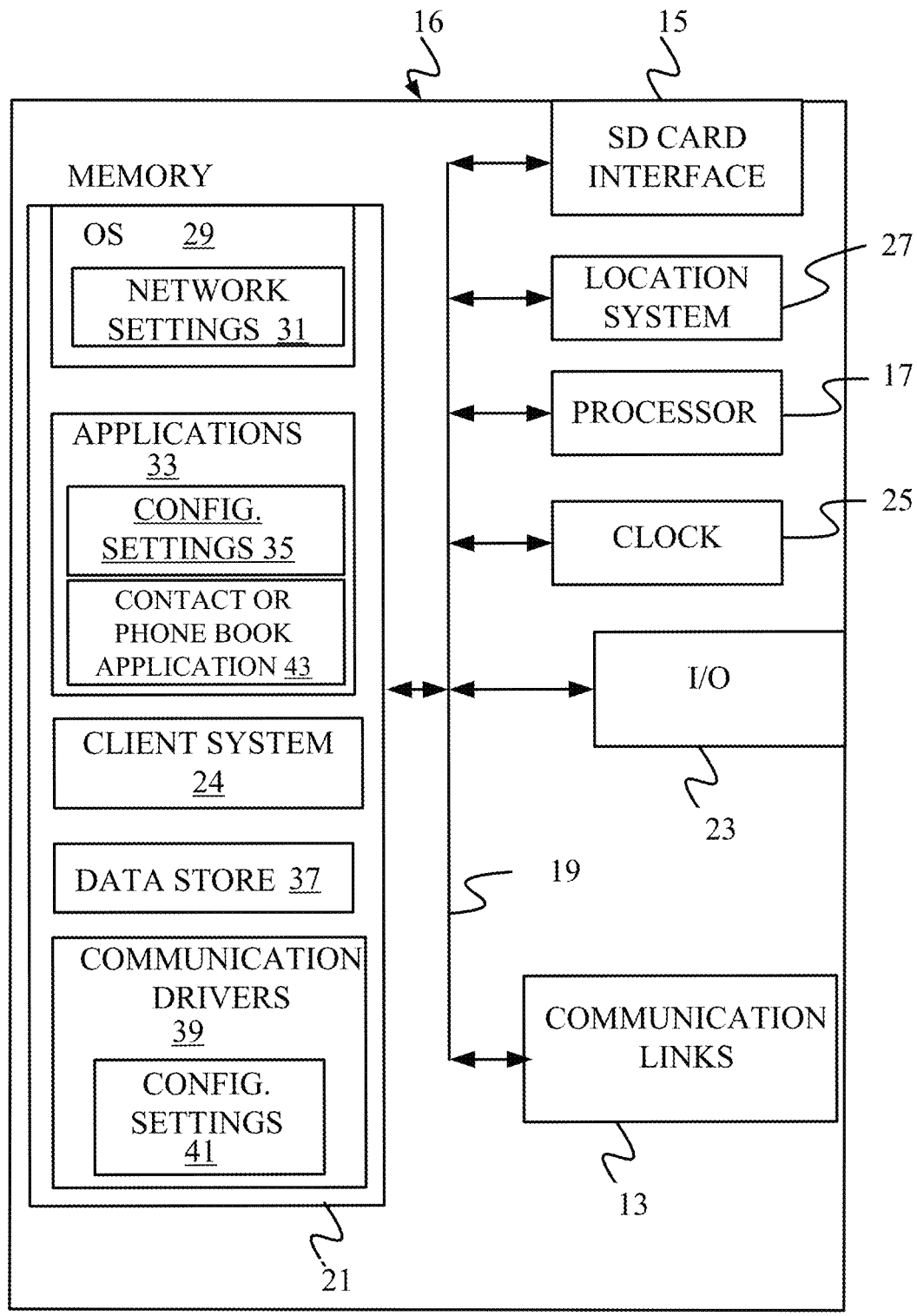
FIGS. 15-17 show examples of mobile devices.
Figure 16:
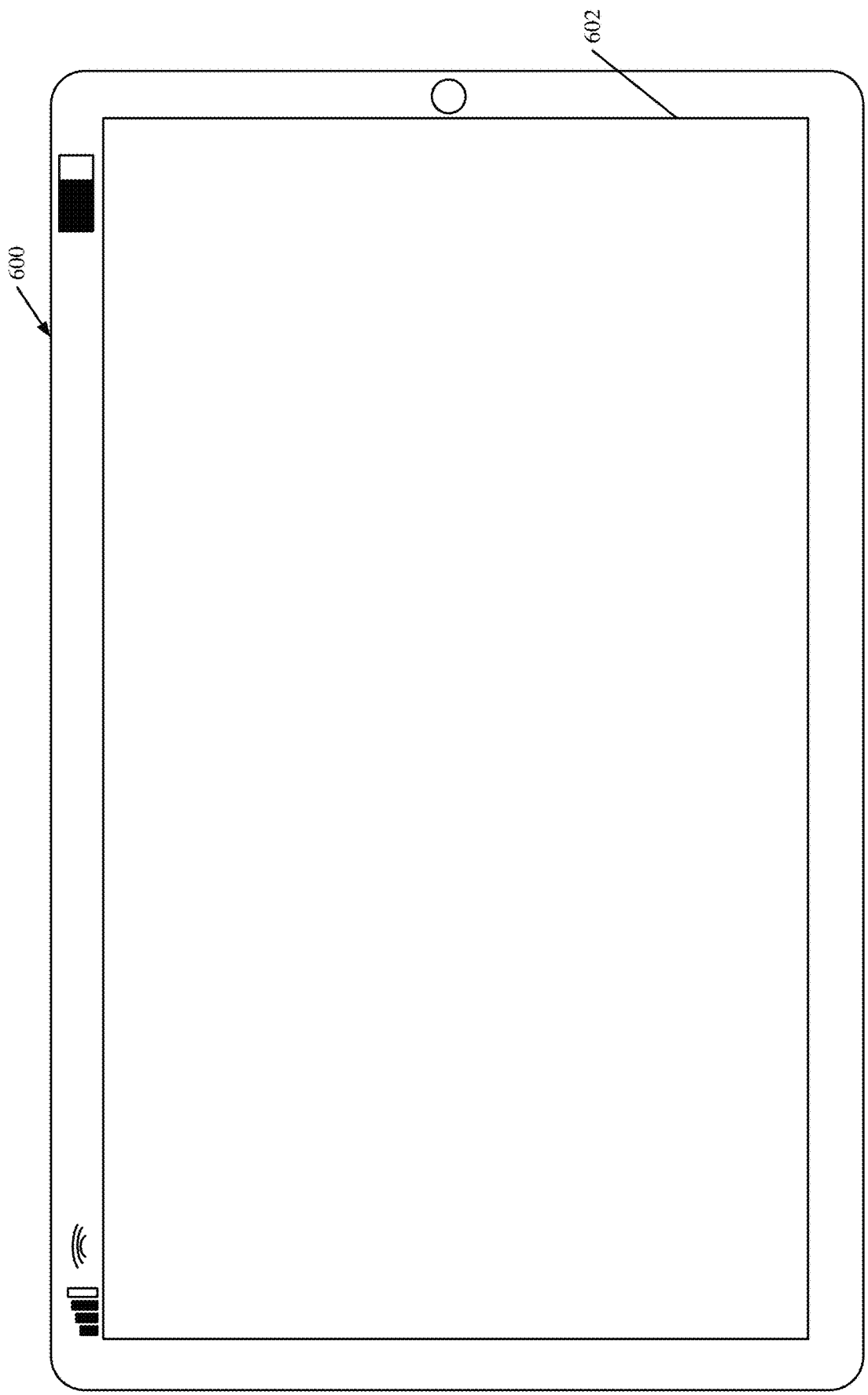
Figure 17:
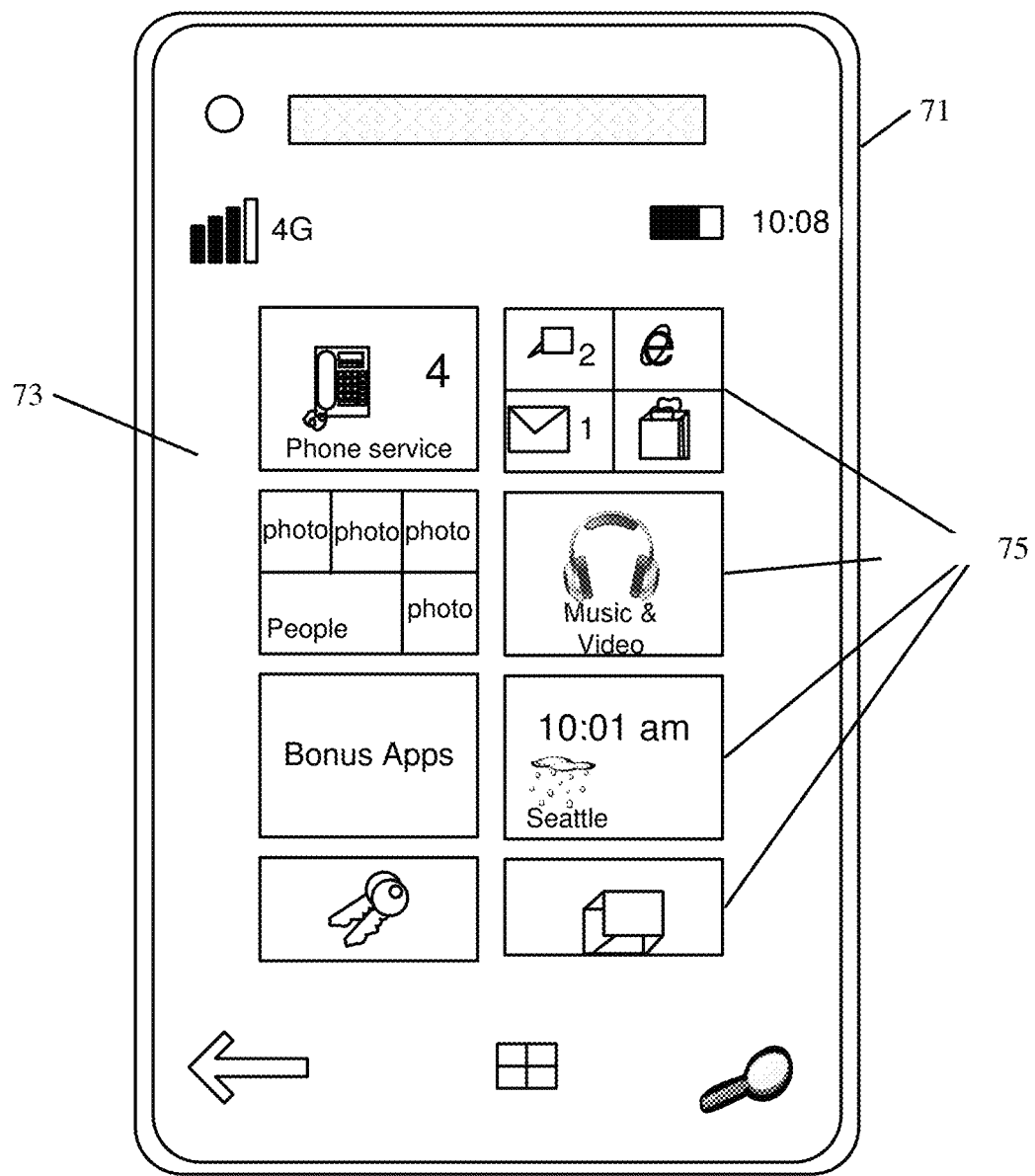

FIG. 15 is a simplified block diagram of one illustrative example of a handheld or mobile computing device that can be used as a user's or client's hand held device 16, in which the present system (or parts of it) can be deployed. For instance, a mobile device can be deployed in the operator compartment of sprayer 100 for use in generating, processing, or displaying the overspray data and position data. FIGS. 16-17 are examples of handheld or mobile devices.

FIG. 15 provides a general block diagram of the components of a client device 16 that can run some components shown in FIG. 6, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, contact or phone book application 43, client system 24, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 16 shows one example in which device 16 is a tablet computer 600. In FIG. 16, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 17 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 18:
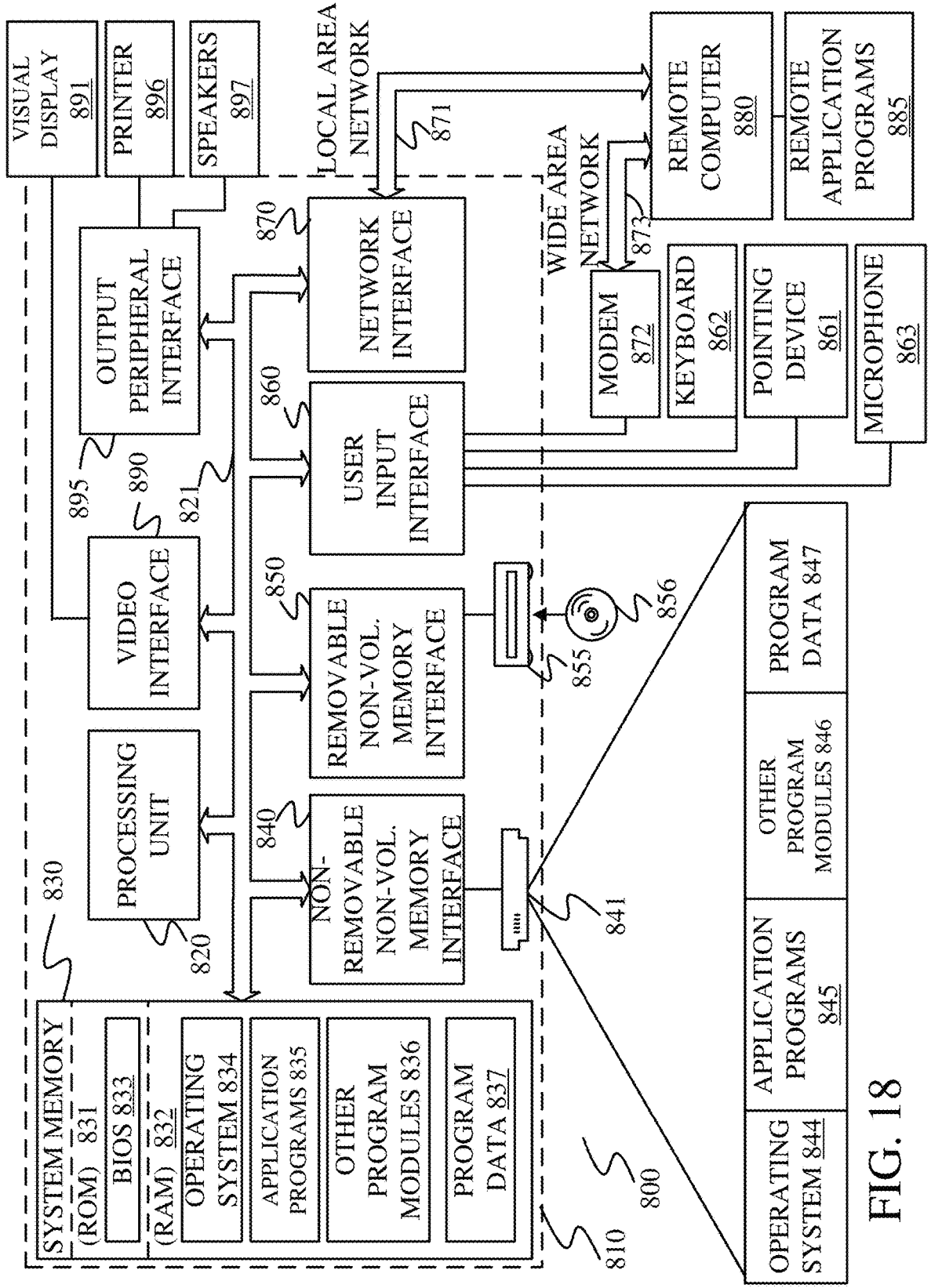
FIG. 18 is a block diagram showing one example of a computing environment that can be used in the architecture illustrated in previous FIGS.

FIG. 18 is one example of a computing environment in which elements of FIG. 6, or parts of it, (for example) can be deployed. With reference to FIG. 18, an example system for implementing some embodiments includes a general-purpose computing device in the form of a computer 810. Components of computer 810 may include, but are not limited to, a processing unit 820 (which can comprise processors or servers from other FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 6 can be deployed in corresponding portions of FIG. 18.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 18 illustrates operating system 834, application programs 835, other program modules 836, and program data 837.

The computer 810 may also include other removable/non-removable volatile/nonvolatile computer storage media. By way of example only, FIG. 18 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 18, provide storage of computer readable instructions, data structures, program modules and other data for the computer 810. In FIG. 18, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include foot pedals, steering wheels, levers, buttons, a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 18 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a mobile agricultural sprayer, comprising:
a frame;
a tank configured to carry a substance to be sprayed;
a spraying mechanism that sprays the substance; and
an overspray detection system that generates control signals to obtain sensor information from a sensor, that senses a spray variable indicative of a presence of the substance, at a sensor location corresponding to a field boundary of a field over which the sprayer is traveling and that receives an overspray detected signal indicative of the sensor sensing the presence of the substance at the sensor location.

Example 2 is the mobile agricultural sprayer of any or all previous examples and further comprising:
sensor position control logic configured to generate a sensor position signal to control a sensor mobility system that moves a position of the sensor.

Example 3 is the mobile agricultural sprayer of any or all previous examples wherein the sensor mobility system is mounted to a pole located at the sensor location and wherein the sensor position control logic generates the sensor position signal to actuate an actuator in the sensor mobility system that moves the sensor relative to the pole.

Example 4 is the mobile agricultural sprayer of any or all previous examples and further comprising:
likely drift detector logic that receives sprayer location information indicative of a geographic location of the sprayer, a wind sensor signal indicative of a value of a sensed wind variable and field characteristic data indicative of the field boundary of the field, and generates an overspray likely signal when a likely overspray condition is identified, based on the sprayer location information, the value of the sensed wind variable and the geographical characteristic of the field.

Example 5 is the mobile agricultural sprayer of any or all previous examples and further comprising:
sensor rest control logic configured to generate a sensor control signal to activate the sensor when the sensor location corresponds to the likely overspray condition and to deactivate the sensor when the sensor location does not correspond to the likely overspray condition.

Example 6 is the mobile agricultural sprayer of any or all previous examples wherein the sensor comprises:
an unmanned vehicle (UV); and
a substance sensor mounted to the UV to sense the spray variable.

Example 7 is the mobile agricultural sprayer of any or all previous examples and further comprising:
a UV mounting assembly coupled to the frame and configured to detachably couple the UV to the frame to be carried by the frame; and
UV deployment logic configured to generate a control signal to detach the UV from the mounting assembly and to generate the control signals to deploy the UV to the sensor location.

Example 8 is the mobile agricultural sprayer of any or all previous examples wherein the overspray detection system comprises:

monitor area logic configured to identify a monitor area where the likely overspray condition will occur and to generate a monitor area signal indicative of the identified monitor area; and mobile sensor deployment logic that generates the control signals to deploy the UV to the sensor location within the monitor area, based on the monitor area signal.

Example 9 is the mobile agricultural sprayer of any or all previous examples wherein the overspray detection system comprises:

overspray detected control logic configured to receive the overspray detected signal from the UV and to generate a control signal to vary a position or elevation of the sensor on the UV in the monitor area and to determine whether the overspray detected signal is received from the UV at the varied position or elevation.

Example 10 is the mobile agricultural sprayer of any or all previous examples wherein the overspray detected control logic is configured to generate a control signal to vary a distance of the UV from the field boundary and to determine whether the overspray detected signal is received from the UV at the varied distance.

Example 11 is the mobile agricultural sprayer of claim 1 wherein the overspray detection system comprises:

an overspray quantity generator configured to generate an overspray quantity indicator indicative of a quantity of the oversprayed substance.

Example 12 is the mobile agricultural sprayer of any or all previous examples wherein the overspray detection system comprises:

an overspray distance generator configured to generate an overspray distance indicator indicative of a distance that the oversprayed substance drifted across the field boundary.

Example 13 is the mobile agricultural sprayer of any or all previous examples wherein the spraying mechanism comprises a set of nozzles and a pump and wherein the overspray detection system comprises:

sprayer control signal generator logic configured to generate sprayer control signals to control at least one of the pump or the set of nozzles based on the overspray detected signal.

Example 14 is the mobile agricultural sprayer of any or all previous examples wherein the overspray detection system comprises:

path control logic configured to generate path control signals to control a path of the mobile agricultural sprayer based on the overspray detected signal.

Example 15 is an overspray detection system, comprising:
a volatile organic compound (VOC) sensor;
overspray sensor interaction logic that generates control signals to obtain sensor data from the VOC sensor, at a sensor location corresponding to a geographic boundary of a field, that senses a sensed variable indicative of a presence of a substance sprayed by the mobile agricultural sprayer in the field; and
overspray detected control logic that receives an overspray detected signal indicative of the VOC sensor sensing the presence of the substance at the sensor location and generates overspray control signals to perform overspray operations based on the overspray detected signal received.

Example 16 is the overspray detection system of any or all previous examples and further comprising:

likely drift detector logic that receives sprayer location information indicative of a geographic location of the mobile agricultural sprayer in the field, and field characteristic data indicative of the geographic boundary of the field, and that generates an overspray likely signal when a likely overspray condition is identified, based on the sprayer location information, the value of the sensed wind direction and wind speed and the geographic boundary of the field; and sensor deployment logic that generates control signals to deploy the VOC sensor to the sensor location, the sensor location corresponding to the likely overspraying condition.

Example 17 is the overspray detection system of any or all previous examples and further comprising:

monitor area logic configured to identify a monitor area where the likely overspray condition will occur and to generate a monitor area signal indicative of the identified monitor area, wherein the overspray or interaction logic generates the control signals to deploy an unmanned vehicle carrying the VOC sensor to the sensor location within the monitor area, based on the monitor area signal.

Example 18 is the overspray detection system of any or all previous examples and further comprising:

sensor position control logic configured to generate a sensor position signal to control a sensor mobility system that moves a position of the VOC sensor.

Example 19 is the overspray detection system of any or all previous examples wherein the sensor mobility system is mounted to a pole located at the sensor location and wherein the sensor position control logic generates the sensor position signal to actuate an actuator in the sensor mobility system that moves the VOC sensor relative to the pole.

Example 20 is a computer implemented method of controlling a mobile agricultural sprayer, comprising:

receiving sprayer location information indicative of a geographic location of the sprayer;
receiving a wind sensor signal indicative of a value of a sensed wind variable;
receiving field boundary data indicative of a geographic boundary of a field;
generating an overspray likely signal when a likely overspray condition is identified, indicating that a substance sprayed by the mobile agricultural sprayer is likely to cross the boundary of the field, based on the sprayer location information, the value of the sensed wind variable and the geographic boundary of the field; and
generating control signals to position a sensor, that senses a spray variable indicative of a presence of the substance, at a sensor location corresponding to the likely overspray condition.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A mobile agricultural sprayer, comprising:
a frame;
a tank configured to carry a substance to be sprayed;
a spraying mechanism that sprays the substance; and
an overspray detection system configured to:
generates control signals to obtain sensor information from a sensor, that senses a spray variable indicative of a presence of the substance, at a sensor location corresponding to a field boundary of a field over which the sprayer is traveling;

receive an overspray detected signal, from the sensor at the sensor location, indicating that the substance has crossed the field boundary; and determine, based on the overspray detected signal, that the substance has crossed the field boundary.

2. The mobile agricultural sprayer of claim 1 and further comprising:

sensor position control logic configured to generate a sensor position signal to control a sensor mobility system that moves a position of the sensor.

3. The mobile agricultural sprayer of claim 2 wherein the sensor mobility system is mounted to a pole located at the sensor location and wherein the sensor position control logic generates the sensor position signal to actuate an actuator in the sensor mobility system that moves the sensor relative to the pole.

4. The mobile agricultural sprayer of claim 2 and further comprising:

likely drift detector logic that receives sprayer location information indicative of a geographic location of the sprayer, a wind sensor signal indicative of a value of a sensed wind variable and field characteristic data indicative of the field boundary of the field, and generates an overspray likely signal when a likely overspray condition is identified, based on the sprayer location information, the value of the sensed wind variable and the geographical characteristic of the field.

5. The mobile agricultural sprayer of claim 4 and further comprising:

sensor rest control logic configured to generate a sensor control signal to activate the sensor when the sensor location corresponds to the likely overspray condition and to deactivate the sensor when the sensor location does not correspond to the likely overspray condition.

6. The mobile agricultural sprayer of claim 1 wherein the sensor comprises:

an unmanned vehicle (UV); and a substance sensor mounted to the UV to sense the spray variable.

7. The mobile agricultural sprayer of claim 6 and further comprising:

a UV mounting assembly coupled to the frame and configured to detachably couple the UV to the frame to be carried by the frame; and UV deployment logic configured to generate a control signal to detach the UV from the mounting assembly and to generate the control signals to deploy the UV to the sensor location.

8. The mobile agricultural sprayer of claim 7 wherein the overspray detection system comprises:

monitor area logic configured to identify a monitor area where the likely overspray condition will occur and to generate a monitor area signal indicative of the identified monitor area; and mobile sensor deployment logic that generates the control signals to deploy the UV to the sensor location within the monitor area, based on the monitor area signal.

9. The mobile agricultural sprayer of claim 8 wherein the overspray detection system comprises:

overspray detected control logic configured to receive the overspray detected signal from the UV and to generate a control signal to vary a position or elevation of the sensor on the UV in the monitor area and to determine whether the overspray detected signal is received from the UV at the varied position or elevation.

10. The mobile agricultural sprayer of claim 9 wherein the overspray detected control logic is configured to generate a control signal to vary a distance of the UV from the field boundary and to determine whether the overspray detected signal is received from the UV at the varied distance.

11. The mobile agricultural sprayer of claim 1 wherein the overspray detection system comprises:

an overspray quantity generator configured to generate an overspray quantity indicator indicative of a quantity of the oversprayed substance.

12. The mobile agricultural sprayer of claim 11 wherein the overspray detection system comprises:

an overspray distance generator configured to generate an overspray distance indicator indicative of a distance that the oversprayed substance drifted across the field boundary.

13. The mobile agricultural sprayer of claim 1 wherein the spraying mechanism comprises a set of nozzles and a pump and wherein the overspray detection system comprises:

sprayer control signal generator logic configured to generate sprayer control signals to control at least one of the pump or the set of nozzles based on the overspray detected signal.

14. The mobile agricultural sprayer of claim 1 wherein the overspray detection system comprises:

path control logic configured to generate path control signals to control a path of the mobile agricultural sprayer based on the overspray detected signal.

15. An overspray detection system, comprising:

a volatile organic compound (VOC) sensor;

overspray sensor interaction logic that generates control signals to obtain sensor data from the VOC sensor, at a sensor location corresponding to a geographic boundary of a field, that senses a sensed variable indicative of a presence of a substance sprayed by the mobile agricultural sprayer in the field; and overspray detected control logic configured to:

receives an overspray detected signal, indicative of the VOC sensor sensing the presence of the substance and indicating that the substance crossed the geographic boundary of the field;

determine, based on the overspray detected signal, that the substance has crossed the geographic boundary of the field; and generates overspray control signals to perform overspray operations based on the determination that the substance has crossed the geographic boundary of the field.

16. The overspray detection system of claim 15 and further comprising:

likely drift detector logic that receives sprayer location information indicative of a geographic location of the mobile agricultural sprayer in the field, and field characteristic data indicative of the geographic boundary of the field, and that generates an overspray likely signal when a likely overspray condition is identified, based on the sprayer location information, the value of the sensed wind direction and wind speed and the geographic boundary of the field; and sensor deployment logic that generates control signals to deploy the VOC sensor to the sensor location, the sensor location corresponding to the likely overspraying condition.

17. The overspray detection system of claim 16 and further comprising:

monitor area logic configured to identify a monitor area where the likely overspray condition will occur and to generate a monitor area signal indicative of the identified monitor area, wherein the overspray or interaction logic generates the control signals to deploy an unmanned vehicle carrying the VOC sensor to the sensor location within the monitor area, based on the monitor area signal.

18. The overspray detection system of claim 15 and further comprising:
sensor position control logic configured to generate a sensor position signal to control a sensor mobility system that moves a position of the VOC sensor.

19. The overspray detection system of claim 18 wherein the sensor mobility system is mounted to a pole located at the sensor location and wherein the sensor position control logic generates the sensor position signal to actuate an actuator in the sensor mobility system that moves the VOC sensor relative to the pole.

20. A computer implemented method of controlling a mobile agricultural sprayer, comprising:

receiving sprayer location information indicative of a geographic location of the sprayer;
receiving a wind sensor signal indicative of a value of a sensed wind variable;
receiving field boundary data indicative of a geographic boundary of a field;
generating an overspray likely signal when a likely overspray condition is identified, indicating that a substance sprayed by the mobile agricultural sprayer is likely to cross the boundary of the field, based on the sprayer location information, the value of the sensed wind variable and the geographic boundary of the field; and
generating control signals to position a sensor, that senses a spray variable indicative of a presence of the substance, at a sensor location corresponding to the likely overspray condition.

* * * * *